US006997422B2

(12) United States Patent
Sweere et al.

(10) Patent No.: US 6,997,422 B2
(45) Date of Patent: Feb. 14, 2006

(54) STAND

(75) Inventors: Harry C. Sweere, Minneapolis, MN (US); Mustafa A. Ergun, White Bear Lake, MN (US); Shaun C. Lindblad, Lino Lakes, MN (US); H. Karl Overn, Vadnais Heights, MN (US)

(73) Assignee: Ergotron, Inc., St. Paul, MN (US)

( * ) Notice: Subject to any disclaimer, the term of this patent is extended or adjusted under 35 U.S.C. 154(b) by 0 days.

(21) Appl. No.: 10/644,437

(22) Filed: Aug. 20, 2003

(65) Prior Publication Data

US 2004/0035989 A1 Feb. 26, 2004

Related U.S. Application Data

(60) Provisional application No. 60/492,015, filed on Aug. 1, 2003, provisional application No. 60/471,869, filed on May 20, 2003, provisional application No. 60/441,143, filed on Jan. 17, 2003, provisional application No. 60/439,221, filed on Jan. 10, 2003, provisional application No. 60/434,333, filed on Dec. 17, 2002, provisional application No. 60/394,807, filed on Aug. 21, 2002.

(51) Int. Cl.
*A47F 5/00* (2006.01)

(52) U.S. Cl. ................................ 248/123.11; 248/919

(58) Field of Classification Search ........... 248/123.11, 248/125.2, 121, 279.1, 280.11, 297.11, 123.2, 248/125.1, 125.8, 295.11, 919, 286.1
See application file for complete search history.

(56) References Cited

U.S. PATENT DOCUMENTS

| | | | |
|---|---|---|---|
| 2,010,214 A | | 8/1935 | Braun |
| 2,168,209 A | | 7/1937 | Haupt |
| 2,178,122 A | | 10/1939 | Ostler et al. |
| 2,471,998 A | | 5/1949 | Berggren |
| 2,480,865 A | | 9/1949 | Lofstrand |
| 2,506,228 A | | 5/1950 | Lofstrand, Sr. |
| 2,657,925 A | | 11/1953 | Crow |
| 2,924,411 A | | 2/1960 | Rouverol |
| 3,269,035 A | | 8/1966 | Bong |
| 3,543,282 A | | 11/1970 | Sautereau |
| 3,575,368 A | | 4/1971 | Thomas et al. |
| 3,675,597 A | | 7/1972 | Oddsen et al. |
| 3,767,181 A | | 10/1973 | Van der Burgt et al. .... 267/136 |
| 3,862,734 A | * | 1/1975 | Buchin et al. ........... 248/125.2 |
| 3,890,907 A | | 6/1975 | Peterson ..................... 108/136 |
| RE28,767 E | | 4/1976 | Kuhlmann et al. |
| 4,215,776 A | | 8/1980 | Esler .......................... 198/823 |

(Continued)

FOREIGN PATENT DOCUMENTS

DE 1091279 10/1960

(Continued)

*Primary Examiner*—Robert P. Olszewski
*Assistant Examiner*—A. Joseph Wujciak
(74) *Attorney, Agent, or Firm*—Fredrickson & Byron, P.A.

(57) ABSTRACT

Methods and apparatus for providing an adjustable balancing force are provided. This mechanism can be used as a lifting force, a counter balancing mechanism or as a horizontal or other force mechanism. A stand in accordance with an exemplary embodiment of the present invention comprises a first component that is slidingly coupled to a second component. A spring mechanism provides a balancing force between the first component and the second component. In some advantageous embodiments of the present invention, the magnitude of the balancing force is substantially equal to a first load. In some advantageous embodiments, a friction force is provided for resisting relative movement between the first component and the second component.

41 Claims, 26 Drawing Sheets

U.S. PATENT DOCUMENTS

| | | | | | |
|---|---|---|---|---|---|
| 4,351,245 | A | | 9/1982 | Laporte | |
| 4,357,249 | A | | 11/1982 | Mellor | 252/12 |
| 4,387,468 | A | | 6/1983 | Fenne et al. | |
| 4,387,876 | A | | 6/1983 | Nathan | 248/571 |
| 4,389,228 | A | | 6/1983 | Leunig | |
| 4,427,243 | A | | 1/1984 | Miller | 312/7.2 |
| 4,494,720 | A | | 1/1985 | Gregory et al. | 248/371 |
| 4,605,189 | A | | 8/1986 | Bruneau | |
| 4,685,648 | A | | 8/1987 | Dobner et al. | |
| 4,691,886 | A | | 9/1987 | Wendling et al. | 248/183 |
| 4,697,977 | A | | 10/1987 | Loomer et al. | 414/662 |
| 4,706,920 | A | | 11/1987 | Ojima et al. | 248/371 |
| 4,751,884 | A | | 6/1988 | Ball | |
| 4,760,622 | A | | 8/1988 | Rohrman | |
| 4,768,762 | A | | 9/1988 | Lund | |
| 4,836,478 | A | | 6/1989 | Sweere | 248/1 E |
| 4,856,740 | A | | 8/1989 | MacLeod et al. | 248/97 |
| 4,914,780 | A | | 4/1990 | Rogers et al. | |
| 4,920,381 | A | | 4/1990 | Mahoney | 355/260 |
| 4,922,836 | A | * | 5/1990 | Damico | 108/146 |
| 4,953,256 | A | | 9/1990 | Salmela et al. | |
| 4,953,748 | A | | 9/1990 | Wheelock | |
| 4,964,152 | A | | 10/1990 | Kaul et al. | |
| 4,964,221 | A | | 10/1990 | Breyer et al. | |
| 5,101,735 | A | | 4/1992 | Williams | |
| 5,143,333 | A | | 9/1992 | Warden | 248/123.1 |
| 5,160,104 | A | | 11/1992 | Sher | 248/176 |
| 5,246,191 | A | | 9/1993 | Moss | 248/118.3 |
| 5,305,996 | A | | 4/1994 | Taniwa et al. | 271/22 |
| 5,311,827 | A | | 5/1994 | Greene | |
| 5,400,721 | A | | 3/1995 | Greene | |
| 5,487,525 | A | | 1/1996 | Drabczyk et al. | 248/639 |
| 5,520,361 | A | | 5/1996 | Lee | 248/398 |
| 5,589,849 | A | | 12/1996 | Ditzik | 345/126 |
| 5,626,323 | A | | 5/1997 | Lechman et al. | 248/286.1 |
| 5,668,570 | A | | 9/1997 | Ditzik | 345/173 |
| 5,718,406 | A | | 2/1998 | Long | 248/600 |
| 5,722,513 | A | | 3/1998 | Rowan et al. | 187/269 |
| 5,738,316 | A | | 4/1998 | Sweere et al. | 248/123.11 |
| 5,743,503 | A | | 4/1998 | Voeller et al. | 248/284.1 |
| 5,836,562 | A | | 11/1998 | Danzyger et al. | 248/295.11 |
| 5,842,672 | A | | 12/1998 | Sweere et al. | 248/278.1 |
| 5,860,370 | A | | 1/1999 | Poniecki | 108/137 |
| 5,876,008 | A | | 3/1999 | Sweere et al. | 248/325 |
| 5,881,984 | A | | 3/1999 | Lin | 248/284.1 |
| 5,902,201 | A | | 5/1999 | Vermeer et al. | 474/109 |
| 5,904,328 | A | * | 5/1999 | Leveridge et al. | 248/124.1 |
| 5,918,841 | A | | 7/1999 | Sweere et al. | 248/123.11 |
| 5,924,665 | A | | 7/1999 | Sweere et al. | 248/280.11 |
| 5,947,429 | A | | 9/1999 | Sweere et al. | 248/123.11 |
| 5,967,479 | A | | 10/1999 | Sweere et al. | 248/280.11 |
| 5,992,809 | A | | 11/1999 | Sweere et al. | 248/278.1 |
| 6,012,693 | A | | 1/2000 | Voeller et al. | 248/280.11 |
| 6,019,332 | A | | 2/2000 | Sweere et al. | 248/284.1 |
| 6,026,755 | A | | 2/2000 | Long | 108/147 |
| 6,064,373 | A | | 5/2000 | Ditzik | 345/173 |
| 6,189,849 | B1 | | 2/2001 | Sweere et al. | 248/286.1 |
| 6,227,518 | B1 | | 5/2001 | Sun | 248/923 |
| 6,282,264 | B1 | * | 8/2001 | Smith et al. | 378/189 |
| 6,286,794 | B1 | * | 9/2001 | Harbin | 248/123.2 |
| 6,326,955 | B1 | | 12/2001 | Ditzik | 345/173 |
| 6,378,829 | B1 | | 4/2002 | Strater et al. | |
| 6,434,851 | B1 | | 8/2002 | Nishina | |
| 6,702,238 | B1 | * | 3/2004 | Wang | 248/125.8 |
| 6,712,321 | B1 | * | 3/2004 | Su et al. | 248/123.11 |
| 6,783,105 | B1 | * | 8/2004 | Oddsen, Jr. | 248/279.1 |
| 6,796,537 | B1 | * | 9/2004 | Lin | 248/162.1 |
| 2002/0088910 | A1 | | 7/2002 | Sweere et al. | 248/286.1 |
| 2002/0100851 | A1 | | 8/2002 | Abramowsky et al. | |
| 2004/0011932 | A1 | * | 1/2004 | Duff | 248/157 |
| 2004/0035243 | A1 | | 2/2004 | Duval | |
| 2004/0084585 | A1 | * | 5/2004 | Watanabe et al. | 248/276.1 |
| 2004/0118984 | A1 | * | 6/2004 | Kim et al. | 248/149 |

FOREIGN PATENT DOCUMENTS

| | | | | | |
|---|---|---|---|---|---|
| DE | 1171222 | | | 5/1964 | |
| DE | 1611809 | A1 | | 1/1971 | |
| DE | 3406669 | A1 | | 8/1985 | |
| DE | 3610612 | A2 | | 10/1987 | |
| DE | 19635236 | C1 | | 3/1998 | |
| DE | 299 08 098 | U1 | | 9/1999 | 9/35 |
| EP | 0 183 938 | A1 | | 6/1986 | 17/24 |
| EP | 1 052 472 | A2 | | 11/2000 | |
| FR | 831 809 | | | 9/1938 | |
| FR | 2 037 056 | | | 12/1970 | |
| GB | 785363 | | | 10/1957 | |
| GB | 2 154 442 | A | | 9/1985 | |
| GB | 2 346 071 | A | | 8/2000 | |
| JP | 2003295161 | A | * | 10/2003 | |
| WO | WO 02/44609 | A1 | | 6/2002 | |

* cited by examiner

STAND

RELATED APPLICATIONS

The present Application claims the benefit of U.S. Provisional Patent Application, Ser. No. 60/394,807, filed Aug. 21, 2002.

The present Application claims the benefit of U.S. Provisional Patent Application, Ser. No. 60/434,333, filed Dec. 17, 2002.

The present Application claims the benefit of U.S. Provisional Patent Application, Ser. No. 60/439,221, filed Jan. 10, 2003.

The present Application claims the benefit of U.S. Provisional Patent Application, Ser. No. 60/441,143, filed Jan. 17, 2003.

The present Application claims the benefit of U.S. Provisional Patent Application, Ser. No. 60/471,869, filed May 20, 2003.

The present Application claims the benefit of a U.S. Provisional Patent Application No. 60/492,015 filed on Aug. 1, 2003.

The entire disclosure of the above-mentioned patent applications is hereby incorporated by reference herein.

FIELD OF THE INVENTION

The present invention relates generally to an apparatus for supporting a load or for supplying a constant force in either a vertical or horizontal or other orientation.

BACKGROUND OF THE INVENTION

There are many applications in which lifts, counter-balances and force providing mechanisms may be useful. Mechanisms such as these can be used to raise and lower a variety of items, including the examples listed below:

- video monitors of all sizes
- furniture work surfaces
- production assembly tools
- work load transfer equipment
- kitchen cabinets
- vertically oriented exercise equipment
- robot control devices
- windows These mechanisms can also be used to provide forces in other orientations (e.g., horizontal). Examples of such applications include:

- continuous constant force feeding systems for machine tools
- horizontally oriented exercise equipment
- drawer closing applications
- door closing application One application for such a mechanism is the support of a display monitor for a personal computer. Personal computers and/or display monitors are often placed directly on a desk or on a computer case. However, to increase desk space, or to respond to the ergonomic needs of different operators, computer monitors are sometimes mounted on elevating structures. Alternatively, monitors are mounted to a surface such as a wall, instead of placing the monitor on a desk or a cart.

However, personal computers and/or display monitors are often used by multiple operators at different times during a day. In some settings, one computer and/or monitor may be used by multiple people of different sizes and having different preferences in a single day. Given the differences in people's size and differences in their preferences, a monitor or display adjusted at one setting for one individual is highly likely to be inappropriate for another individual. For instance, a child would have different physical space needs than an adult using the same computer and monitor.

In addition, operators are using computers for longer periods of time which increases the importance of comfort to the operator. An operator may choose to use the monitor as left by the previous user despite the discomfort, annoyance and inconvenience experienced by a user who uses settings optimized for another individual, which may even result in injury after prolonged use.

Moreover, as monitors grow in size and weight, ease of adjustability is an important consideration. For monitors requiring frequent adjustment, adjustability for monitors has been provided using an arm coupled with gas springs, where the arm is hingedly coupled with the desk or a vertical surface. However, the gas springs are costly and wear out over time. In addition, the gas springs require a significant amount of space, for instance arm length, which can be at a premium in certain applications, such as in hospitals.

Thus, there is a need for a monitor support mechanism which is compact, less costly to manufacture and maintain, has increased reliability, allows easy adjustability, is scalable to many different sized monitors, is adaptable to provide a long range of travel, and is adaptable to provide constant support force as the monitor is being positioned.

SUMMARY OF THE INVENTION

The present invention relates generally to an apparatus for supporting a load or for supplying a constant force in either a vertical or a horizontal or other orientation. The attached drawings and detailed description depict selected exemplary embodiments and are not intended to limit the scope of the invention. In order to describe the details of the invention, reference is made to a video monitor lift application as one example of the many applications in which the inventive device can be used.

A stand in accordance with an exemplary embodiment of the present invention comprises a first component that is slidingly coupled to a second component. A spring mechanism may advantageously provide a balancing force between the second component and the first component. In some advantageous embodiments of the present invention, the magnitude of the balancing force is substantially equal to a first load.

In some exemplary embodiments of the present invention, the spring mechanism comprises a constant force spring. In other exemplary embodiments of the present invention, the spring, mechanism comprises a spring that provides a force that increases as a deflection of the spring increases. When this is the case, a mechanism for converting the ascending force of the spring to a substantially constant counter-balancing force may be provided.

In one exemplary embodiment of the present invention, the spring mechanism comprises a first roller, a second roller, and a cam disposed between the first roller and the second roller. The first roller is urged against a first cam surface of the cam by a first spring and the second roller is urged against a second cam surface by a second spring. In some embodiments of the present invention, the rollers act upon the cam to produce a balancing force that is generally equal and opposite to a first load. When this is the case, the rollers and the cam tend to remain stationary relative to one another unless an outside force intervenes.

One exemplary embodiment of the present invention includes a constant force spring that is disposed about a mandrel. The mandrel is rotatably supported by a shaft that is fixed to a bracket. The bracket in turn, is coupled to one of the head or the base. A distal portion of the constant force spring is coupled to the other of the head or the base.

It has been found that a machine in accordance with the present invention provides extremely smooth motion between a first component and a second component that slidingly engage one another. In some applications, one or more friction pads may be provided to provide a "pause" at a particular position and to provide increased stability at a particular position.

In some advantageous embodiments, one or more friction forces are provided for resisting relative movement between the first component and the second component. In some embodiments of the present invention, the magnitude of the one or more friction forces are selected so as to compensate for a predicted non-linearity in the behavior of one or more springs of the spring mechanism. In some embodiments of the present invention, the magnitude of the one or more friction forces are selected to be sufficiently large to prevent relative movement between a first component and a second component of a stand when a characteristic of one or more springs (e.g., a spring constant) varies over time. For example, the magnitude of the one or more friction forces may be selected so as to be sufficiently large to prevent relative movement between the first component and the second component when a material of one or more springs creeps over time.

DETAILED DESCRIPTION

The following detailed description should be read with reference to the drawings, in which like elements in different drawings are numbered identically. The drawings, which are not necessarily to scale, depict selected embodiments and are not intended to limit the scope of the invention. Examples of constructions, materials, dimensions, and manufacturing processes are provided for selected elements. All other elements employ that which is known to those of skill in the field of the invention. Those skilled in the art will recognize that many of the examples provided have suitable alternatives that can be utilized.

Figure 1:
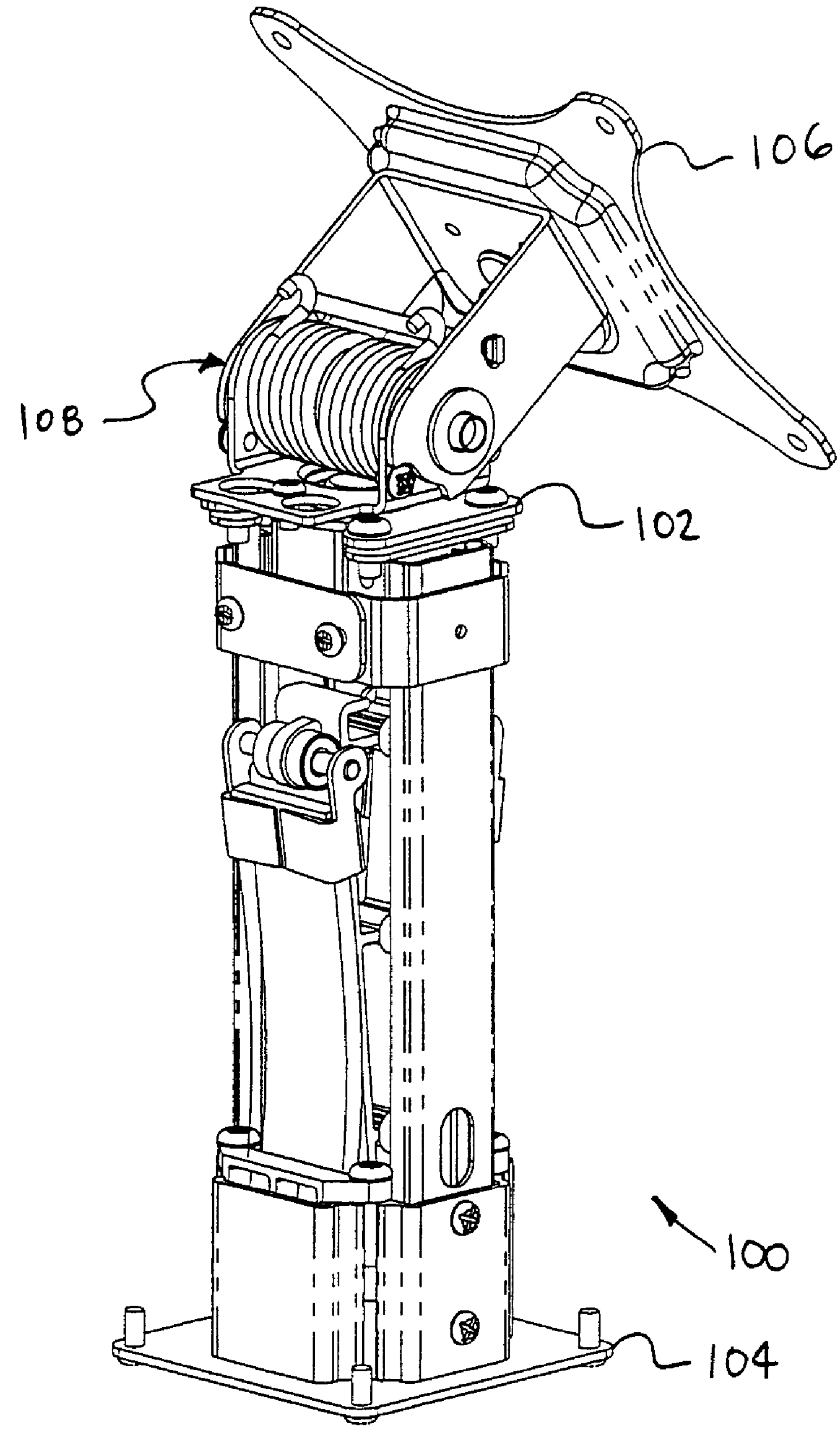
FIG. 1 is a perspective view of a stand in accordance with an exemplary embodiment of the present invention.

FIG. 1 is a perspective view of a stand 100 in accordance with an exemplary embodiment of the present invention. Stand 100 of FIG. 1, comprises a head 102 that is slidingly couple to a base 104. A mounting bracket 106 is coupled to head 102 by a pivot mechanism 108 in the embodiment of FIG. 1. A device such as, for example, an electronic display may be fixed to mounting bracket 106 so that stand 100 supports the device at a desired position. In the embodiment of FIG. 1, pivot mechanism 108 advantageously provides a tilting motion to mounting bracket 106 so that mounting bracket 106 can be arranged at a desired angle of tilt. In a preferred embodiment, head 102 and base 104 are moveable relative to one another for selectively repositioning the device. For example, head 102 may be raised and lowered relative to base 104. In FIG. 1, stand 100 is shown in a generally retracted state in which head 102 is relatively close to base 104.

Figure 2:
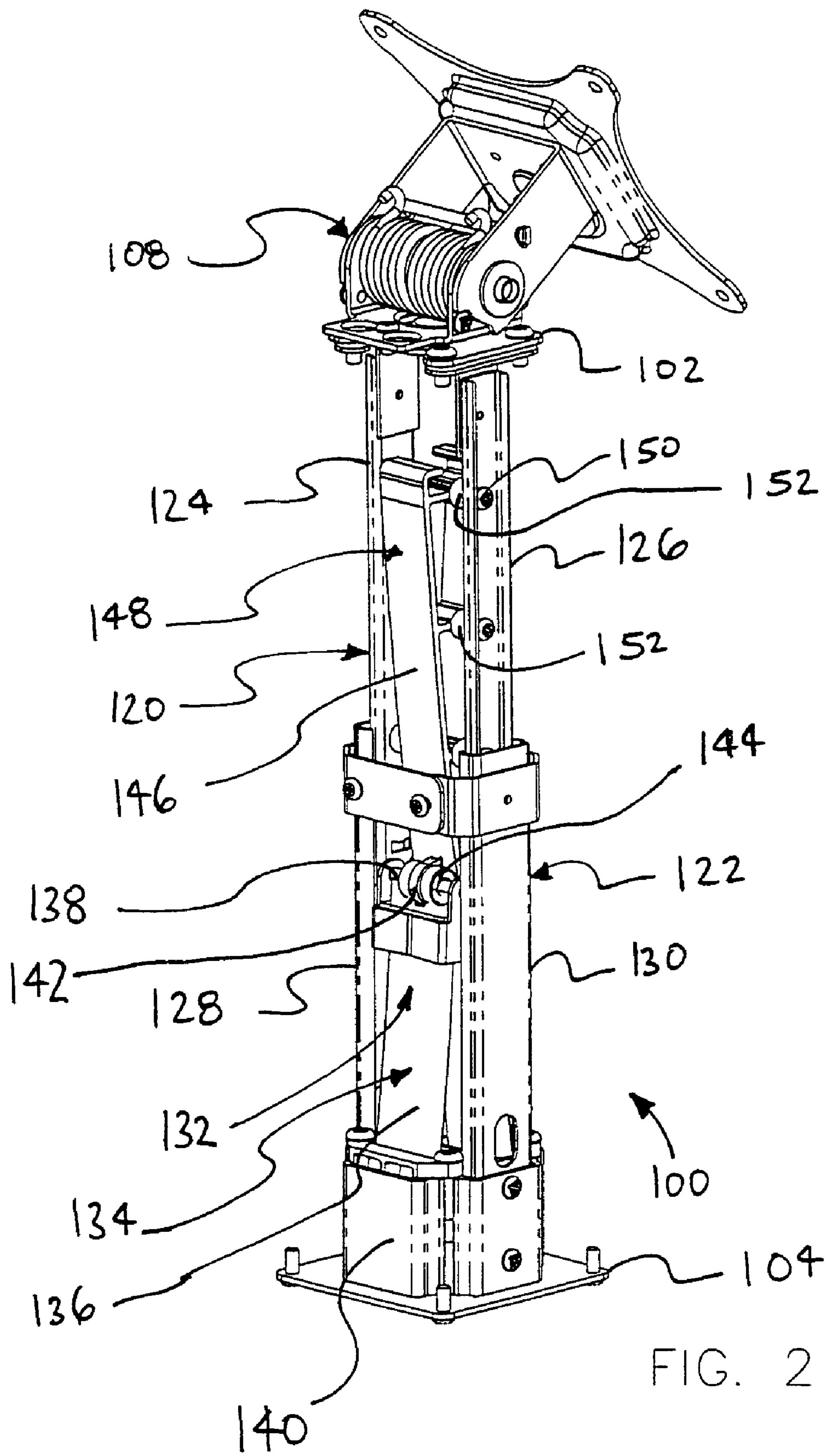
FIG. 2 is an additional perspective view of stand shown in the previous figure.

FIG. 2 is an additional perspective view of stand 100 shown in the previous figure. In the embodiment of FIG. 2, stand 100 is shown in a generally extended state in which head 102 is located farther from base 104 (relative to the state shown in the previous figure). In the embodiment of FIG. 2, head 102 is slidingly coupled to base 104 by a first slide 120 and a second slide 122. In the embodiment of FIG. 2, head 102 is connected to a first inner rail 124 of a first slide 120 and a second inner rail 126 of a second slide 122.

In FIG. 2, base 104 is shown connected to a first outer rail 128 of first slide 120 and a second outer rail 130 of second slide 122.

With reference to FIG. 2, it may be appreciated that a spring mechanism 132 is coupled between head 102 and base 104. Spring mechanism 132 may advantageously provide a balancing force between head 102 and base 104. In the embodiment of FIG. 2, spring mechanism 132 comprises a cam 148 that is fixed to first inner rail 124 and second inner rail 126.

In the embodiment of FIG. 2, spring mechanism 132 also comprises a first spring assembly 134 including a first spring 136 and a first axle 138 that is coupled to a distal portion of first spring 136 A proximal portion of first spring 136 is fixed to base 104 using a mounting block 140. A first shoe 142 and a first roller 144 are disposed about first axle 138. First shoe 142 and first roller 144 can be seen contacting a first cam surface 146 of cam 148 in FIG. 2. In some advantageous embodiments, first shoe 142 and first roller 144 are free to pivot about first axle 138.

In the embodiment of FIG. 2 a plurality of cam fasteners 150 and a plurality of cam spacers 152 are provided for fixing cam 148 to first inner rail 124 of first slide 120 and second inner rail 126 of second slide 122. Also in the embodiment of FIG. 2, a pivot mechanism 108 is fixed to head 102 by a plurality of fasteners.

Figure 3:
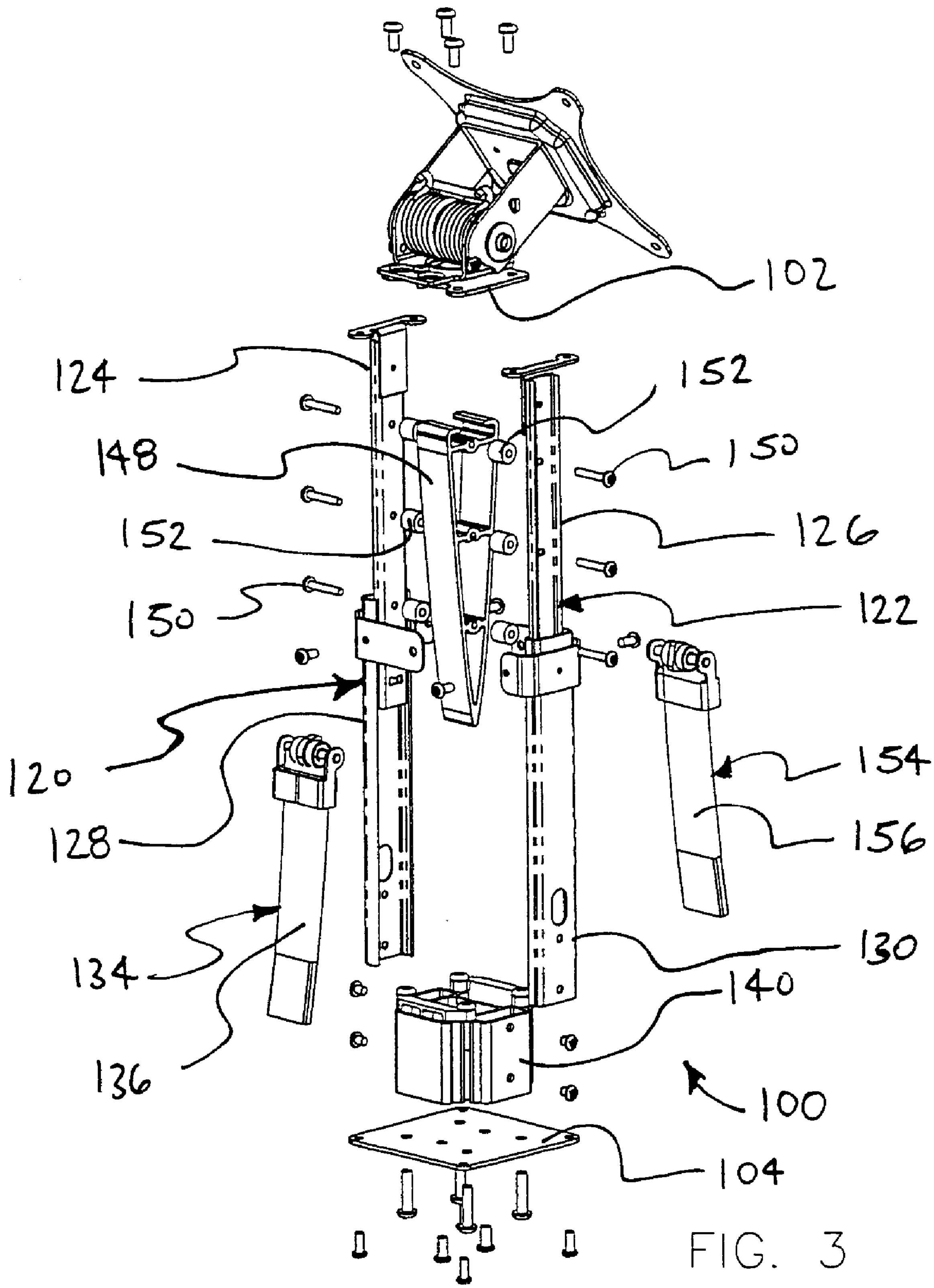
FIG. 3 is an exploded view of stand shown in the previous figure.

FIG. 3 is an exploded view of stand I 00 shown in the previous figure. A plurality of cam fasteners 150 and a plurality of cam spacers 152 are visible in FIG. 3. Cam fasteners 150 and cam spacers 152 may be used for fixing cam 148 to a first inner rail 124 of first slide 120 and a second inner rail 126 of second slide 122.

A first spring assembly 134 and a second spring assembly 154 are also shown in FIG. 3. First spring assembly 134 and second spring assembly 154 include a first spring 136 and a second spring 156 respectively. In the embodiment of FIG. 1, first spring 136 and a second spring 156 may be selectively fixed to base 104 using a mounting block 140.

A head 102 and a base 104 are also shown in FIG. 3. Head 102 and base 104 may be slidingly coupled to one another by a first slide 120 and a second slide 122. First slide 120 comprises an first inner rail 124 and a first outer rail 128. Second slide 122 comprises an second inner rail 126 and a second outer rail 130.

Figure 4:
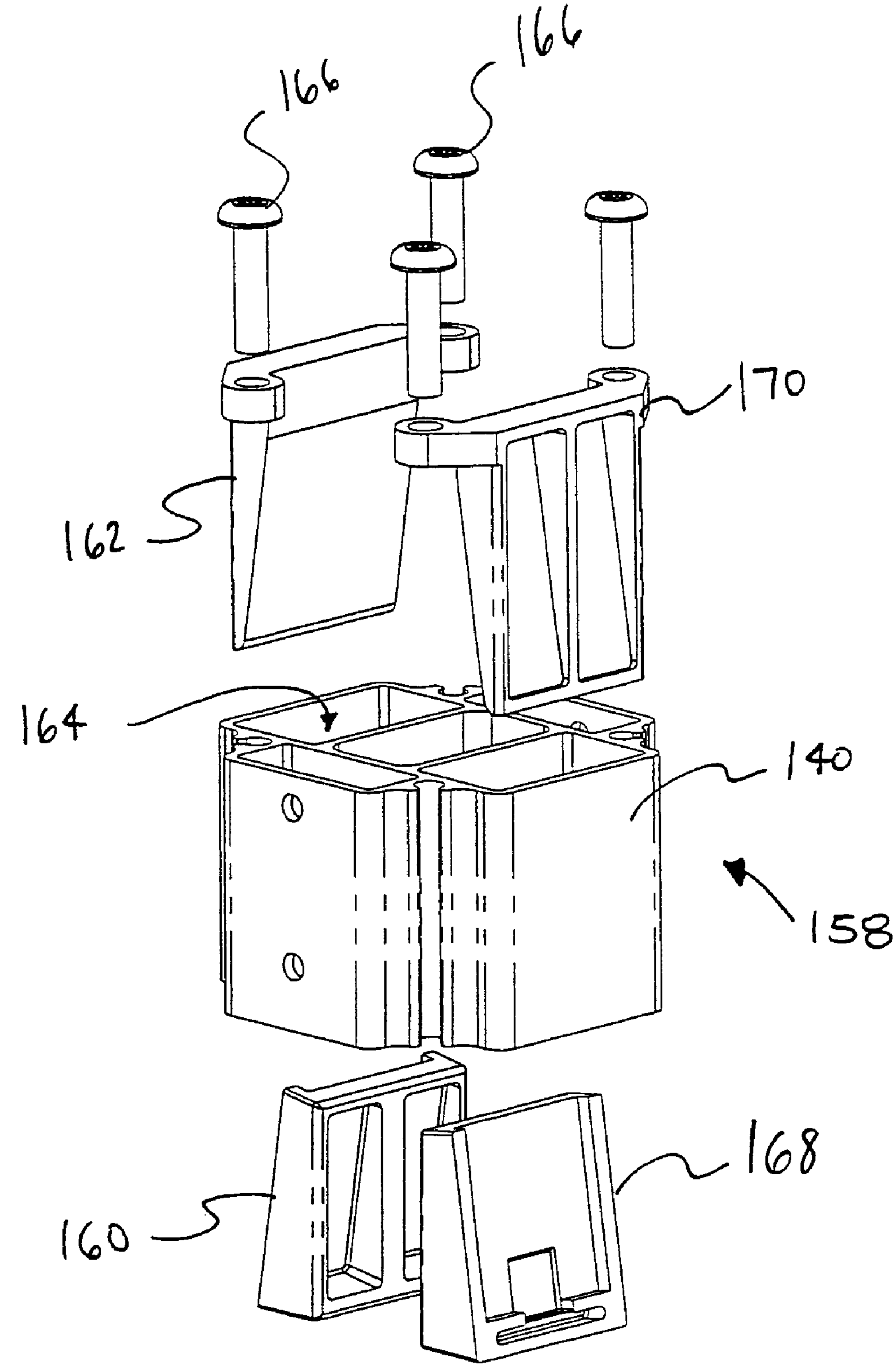
FIG. 4 is an exploded assembly view of a mounting block assembly in accordance with an exemplary embodiment of the present invention.

FIG. 4 is an exploded assembly view of a mounting block assembly 158 in accordance with an exemplary embodiment of the present invention. A mounting block assembly 158 in accordance with the present invention may be used to selectively fix proximal portions of a first spring and a second spring. Mounting block assembly 158 includes a first wedge 160 and a first keeper 162. In the embodiment of FIG. 4, a first cavity 164 defined by a mounting block 140 is dimensioned to receive first wedge 160 and first keeper 162 while a proximal portion of a first spring is disposed therebetween. A clamping force may be advantageously applied to the first spring by first wedge 160 and first keeper 162. This clamping force can be increased by tightening a plurality of fasteners 166. Mounting block assembly 158 also includes a second wedge 168 and a second keeper 170. Second wedge 168 and second keeper 170 may be used, for example, to retain a proximal portion of a second spring.

Figure 5:
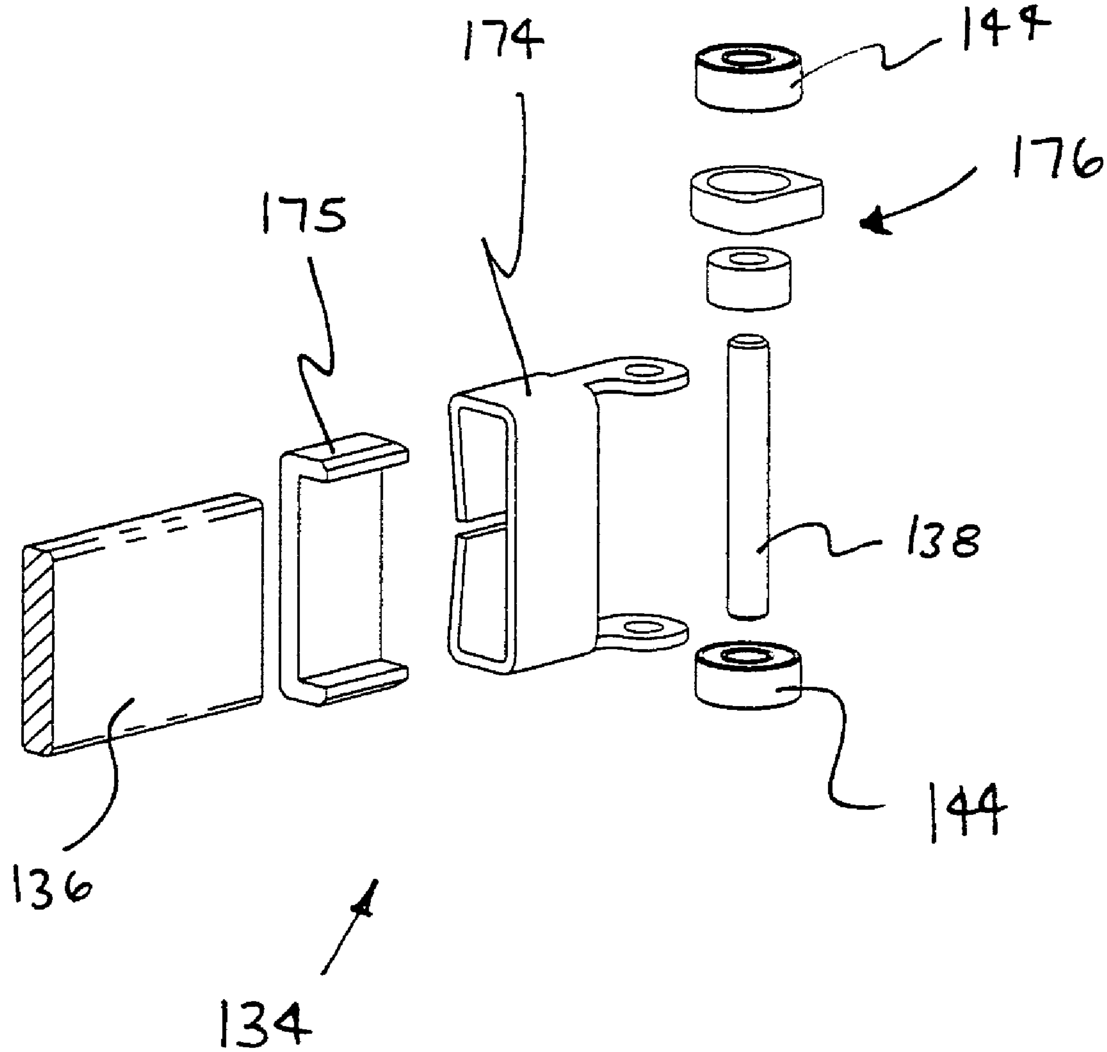
FIG. 5 is an exploded view of a first spring assembly including a first spring and a first axle.

FIG. 5 is an exploded view of a first spring assembly 134 including a first spring 136 and a first axle 138. First axle 138 may be coupled to first spring 136 by a bracket 174 and a spacer 175. Various methods may be used to fix bracket 174 to first spring 136 without deviating from the spirit and scope of the present invention. Examples of methods that may be suitable in some applications include press fitting, friction fitting and/or adhesive bonding. First axle 138 is received by a pair of first rollers 144 and a shoe 176. In the embodiment of FIG. 5, shoe 176 comprises a collar and a sleeve.

Figure 6:
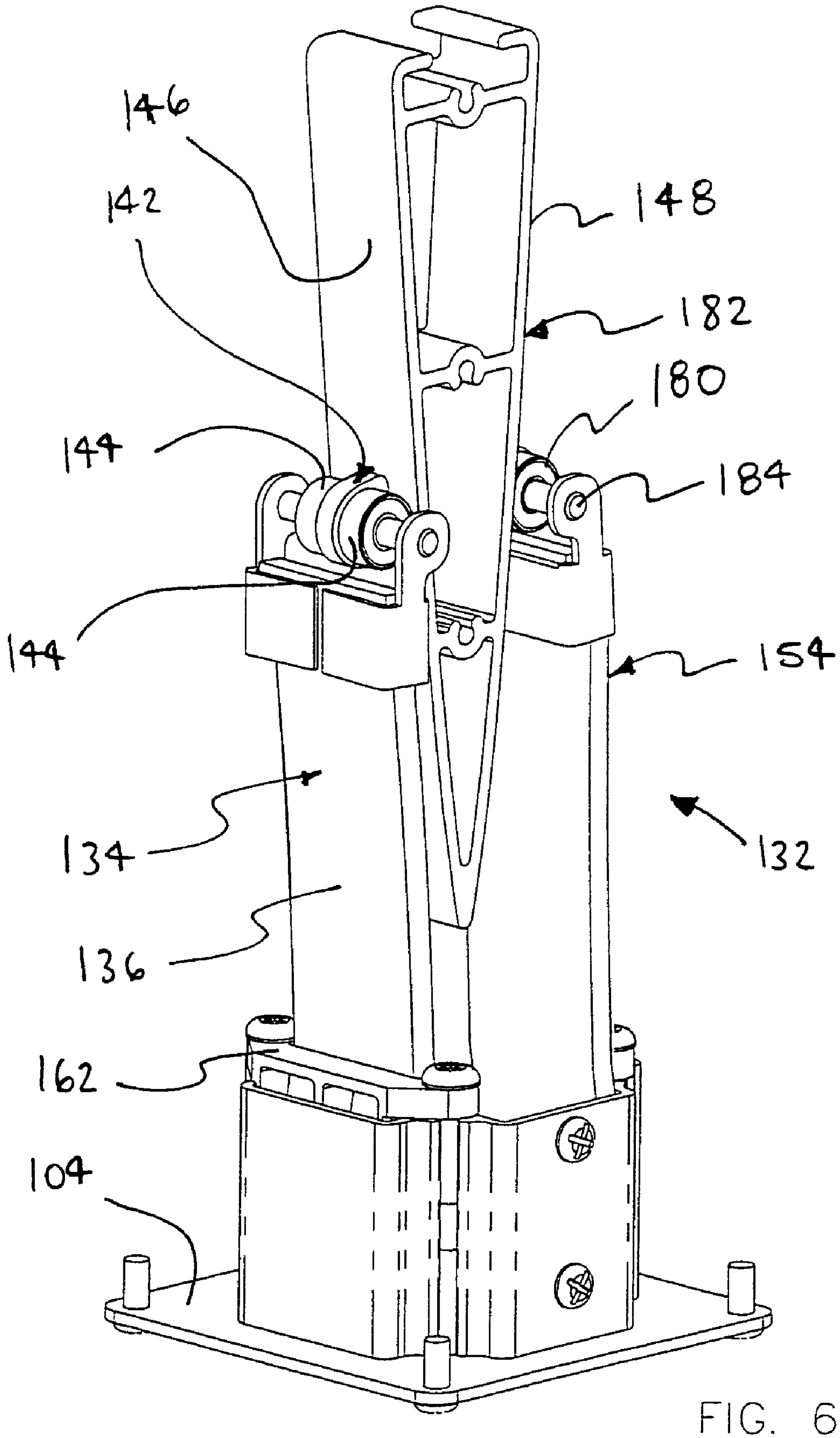
FIG. 6 is a perspective view showing a spring mechanism in accordance with an exemplary embodiment of the present invention.

FIG. 6 is a perspective view showing a spring mechanism 132 in accordance with an exemplary embodiment of the present invention. Spring mechanism 132 comprises a cam 148, a first spring assembly 134 and a second spring assembly 154. In the embodiment of FIG. 6 first spring assembly 134 comprises a first spring 136 having a proximal portion that is fixed to a base 104 by a keeper 162 and a plurality of fasteners.

A first shoe 142 and a pair of first rollers 144 can be seen contacting a first cam surface 146 of cam 148 in FIG. 6. A second roller 180 and a second axle 184 of second spring assembly are also visible in FIG. 6. With reference to FIG. 6, it will be appreciated that a second roller 180 contacts a second cam surface 182 of cam 148.

Figure 7:
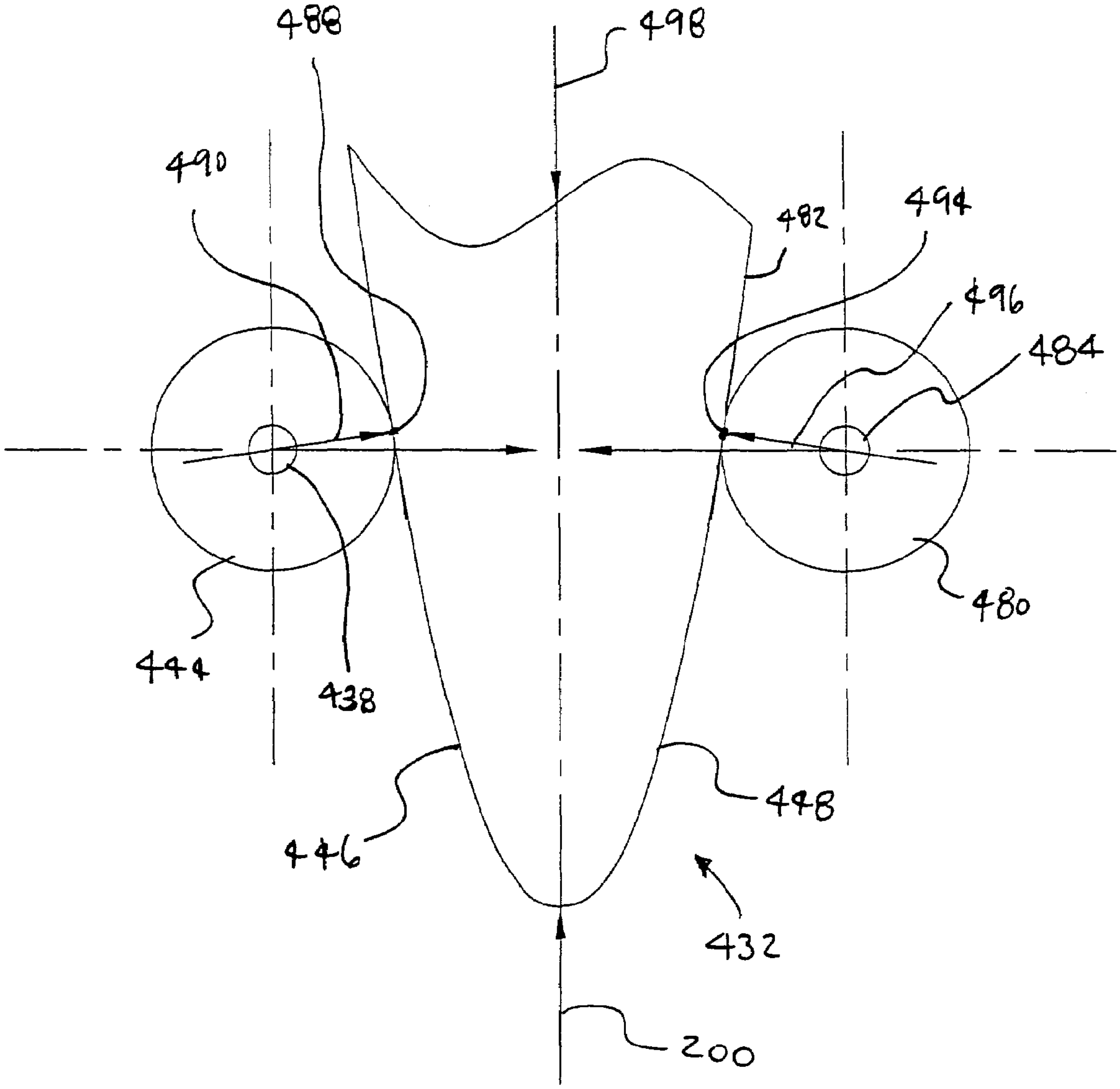
FIG. 7 is a plan view of a spring mechanism in accordance with an illustrative embodiment of the present invention.

FIG. 7 is a plan view of a spring mechanism 432 in accordance with an illustrative embodiment of the present invention. The spring mechanism of FIG. 7 includes a cam 448, a first roller 444 and a second roller 480. In the embodiment of FIG. 7, a first spring acts on a first axle 438 so as to urge a first roller 444 against a first cam surface 446 of cam 448.

In FIG. 7, first roller 444 is shown contacting a first cam surface 446 of cam 448 at a first rolling contact point 488. An arrow illustrating a first roller force 490 is shown acting on first cam surface 446 at first rolling contact point 488 in FIG. 7. First roller 444 is preferably free to rotate about first axle 438.

A second roller 480 is shown contacting a second cam surface 482 at a second rolling contact point 494. In the embodiment of FIG. 7, a second spring may act to urge second roller 480 and a second axle 484 toward second cam surface 482. In FIG. 7, a second roller force 496 is shown acting on second cam surface 482 at second rolling contact point 494.

In FIG. 7, a loading force 498 is also illustrated using an arrow. Loading force 498 is shown acting on cam 448 in FIG. 7. In some embodiments of the present invention, spring mechanism 432 may support loading force 498 including the weight of cam 448 and the weight of a load (e.g., an electronic display) coupled to cam 448.

In some embodiments of the present invention, first cam surface 446 and second cam surface 482 first roller 444 are dimensioned so that a first roller force 490 acting at first rolling contact point 488 and a second roller force 496 acting at a second rolling contact point 494 produce a balancing force 200 that is capable of supporting loading force 498.

Figure 8:
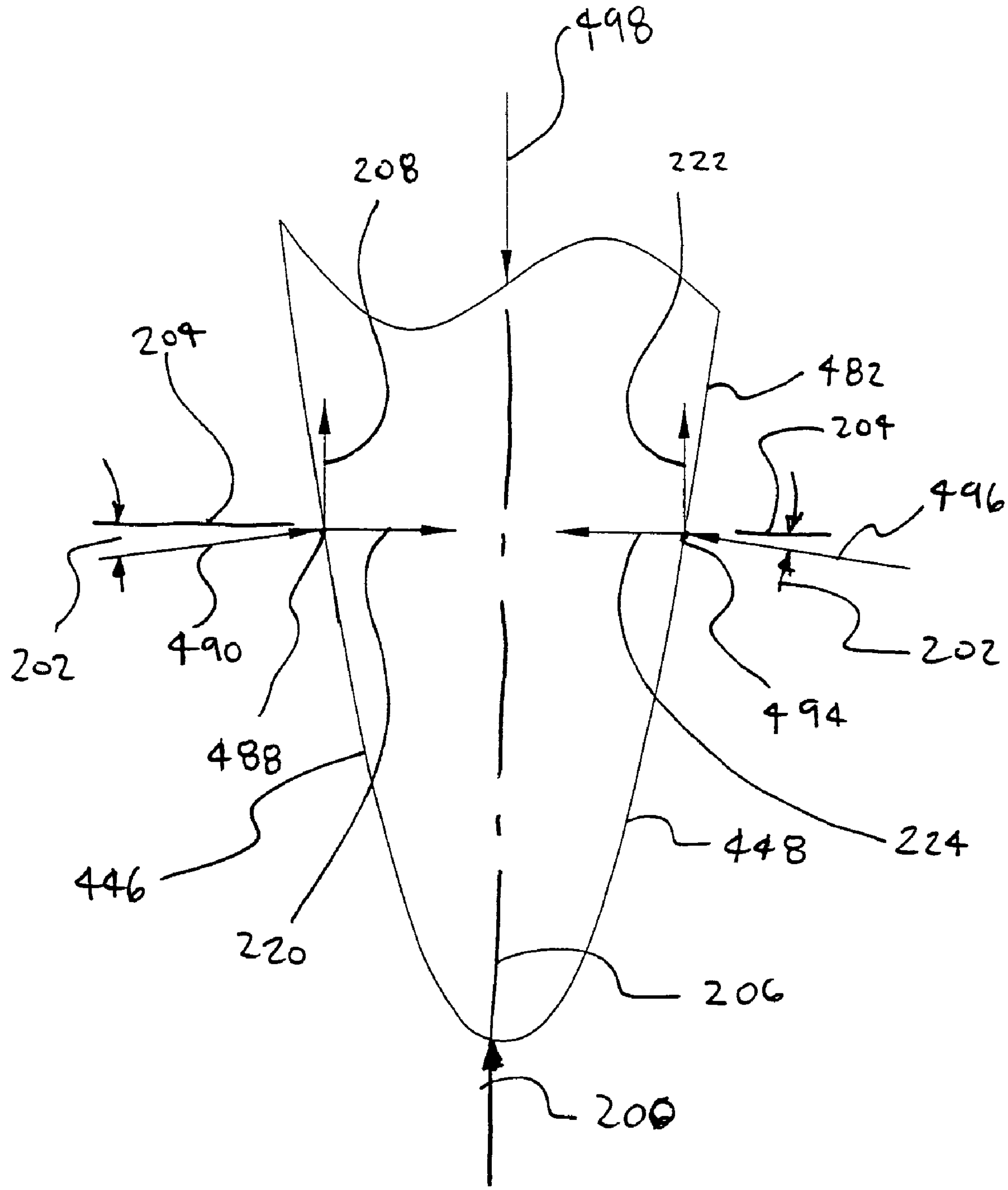
FIG. 8 is a free body diagram of cam shown in the previous figure.

FIG. 8 is a free body diagram of cam 448 shown in the previous figure. In the embodiment of FIG. 8, cam 448 may be considered to be stationary and at equilibrium. Various forces acting on cam 448 are illustrated in FIG. 8 using arrows.

A first roller force 490 is shown acting on first cam surface 446 at first rolling contact point 488. In FIG. 8, the arrow representing first roller force 490 is disposed at an angle 202 relative to a reference line 204. In FIG. 8, reference line 204 is substantially perpendicular to axis 206 of cam 448.

In FIG. 8, it may be appreciated that first roller force 490 may be resolved into a plurality of component vectors. In FIG. 8, a first axial force component 208 is illustrated having a direction which is generally parallel to axis 206 of cam 448. A first lateral force component 220 is illustrated having a direction generally perpendicular to axis 206 of cam 448.

A second roller force 496 is shown acting on second cam surface 482 at second rolling contact point 494. In the exemplary embodiment of FIG. 8, second roller force 496 has been resolved into a second axial force component 222 and a second lateral force component 224. In some embodiments of the present invention, second lateral force is substantially equal to first lateral force.

First axial force component 208 and second axial force component 222 combine to produce a balancing force 200. In some embodiments of the present invention, balancing force 200 is substantially equal to a loading force 498 which is illustrated with an arrow in FIG. 8.

Figure 9:
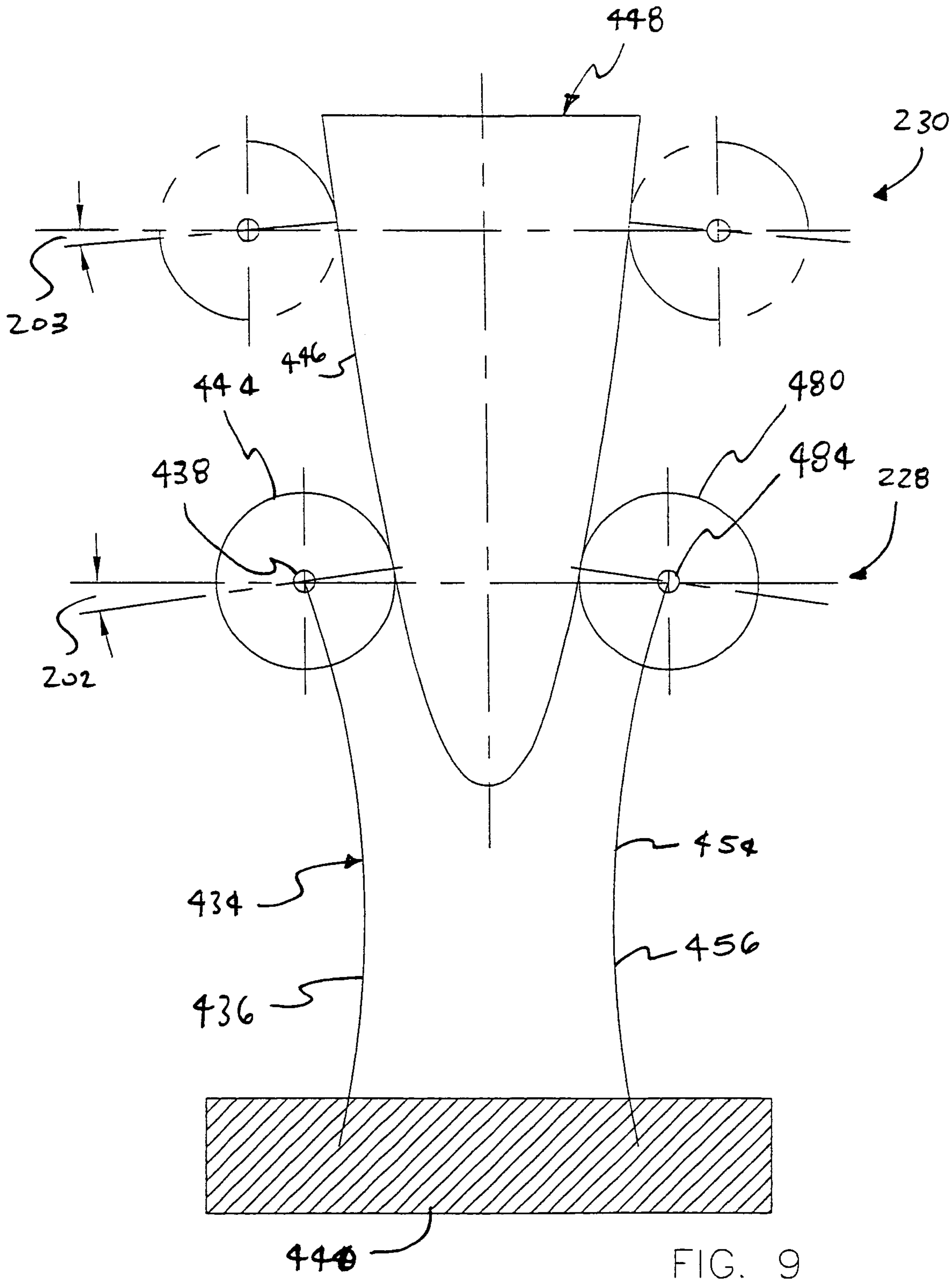
FIG. 9 is a somewhat diagrammatic front view showing a first spring assembly and a second spring assembly.

FIG. 9 is a somewhat diagrammatic front view showing a first spring assembly 434 and a second spring assembly 454. First spring assembly 434 of FIG. 9 includes a first spring 436 having a proximal end fixed to a mounting block 440. A proximal end of a second spring 456 of second spring assembly 454 is also fixed to mounting block 440. A first axle 438 is coupled to first spring 436 proximate the distal end thereof. Similarly, a second axle 484 is coupled to second spring 456 proximate the distal end thereof.

A first roller 444 is disposed about first axle 438 and a second roller 480 is disposed about second axle 484. In some useful embodiments, the first cam surface 446 of the cam 448 has a continually changing slope and/or a continually changing radius of curvature so that the contact angle of the cam 448 changes as the rollers move along cam 448. In the embodiment of FIG. 9, first spring 436 has a first deflection when the rollers are disposed in a first position 228 and a second deflection when the rollers are disposed in a second position 230. Also in the embodiment of FIG. 9, each roller has a first contact angle 202 when the rollers are in first position 228 and each roller has a second contact angle 203 when the rollers are in second position 230. As shown in FIG. 9, first contact angle 202 is different from second contact angle 203, and the first deflection is different from the second deflection.

In a preferred embodiment, first cam surface 446 of the cam 448 has a continually changing slope and/or a continually changing radius of curvature so that the contact angle of the cam 448 changes as the rollers and cam 448 move relative to on another. The slope and/or the radius of curvature of first cam surface 446 may be selected to produce various desirable force profiles including a constant force.

Figure 10:
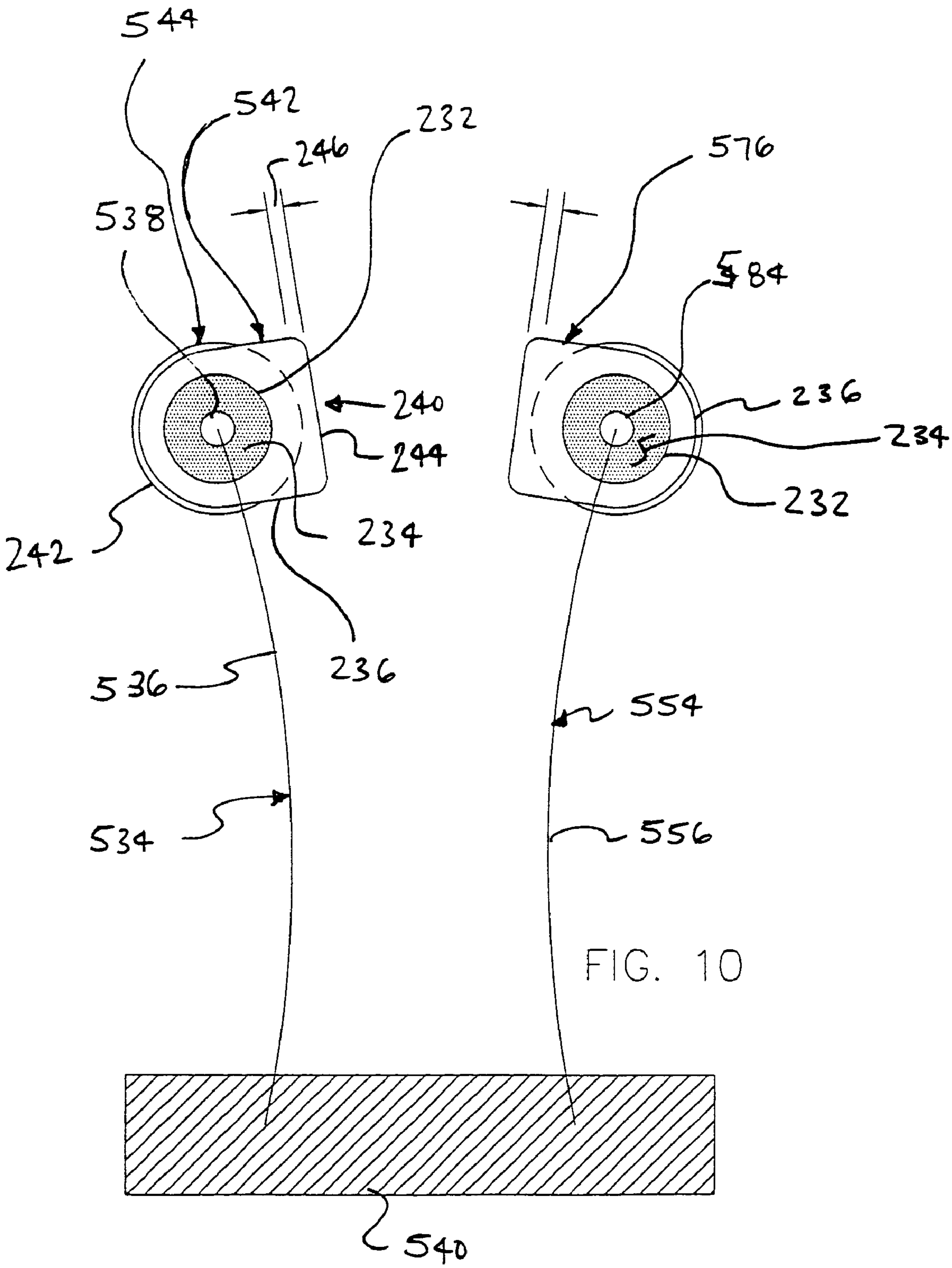
FIG. 10 is a somewhat diagrammatic front view showing a first spring assembly and a second spring assembly.

FIG. 10 is a somewhat diagrammatic front view showing a first spring assembly 534 and a second spring assembly 554. First spring assembly 534 of FIG. 10 includes a first spring 536 having a proximal end fixed to a mounting block 540. A proximal end of a second spring 556 of second spring assembly 554 is also fixed to mounting block 540. A first axle 538 is coupled to first spring 536 proximate the distal end thereof. Similarly, a second axle 584 is coupled to second spring 556 proximate its distal end.

In FIG. 10, a first shoe 542 and a first roller 544 are disposed about first axle 538. In a preferred embodiment, first shoe 542 and first roller 544 are free to pivot about first axle 538. A second shoe 576 is disposed about second axle 584. In the embodiment of FIG. 10, each shoe comprises a collar 236 defining a hole 232 dimensioned to receive a resilient sleeve 234. In the embodiment of FIG. 10, the resilient sleeve 234 of first shoe 542 is shown having a resting shape in which hole 232 of collar 236 and first axle 538 are substantially coaxially aligned with one another. Similarly, the resilient sleeve 234 of second shoe 576 is shown having a resting shape in which hole 232 of collar 236 and second axle 584 are substantially coaxially aligned with one another.

In FIG. 10 it may be appreciated that a distal portion 240 of first shoe 542 extends beyond an outer perimeter 242 of first roller 544. In some advantageous embodiments of the present invention, a distal surface 244 of first shoe 542 is disposed a distance 246 beyond outer perimeter 242 of first roller 544 when resilient sleeve 234 assumes a resting shape as shown in FIG. 10. Also in some advantageous embodiments of the present invention, resilient sleeve 234 is sufficiently deformable to allow first shoe 542 to assume a retracted position in which distal surface 244 of distal portion 240 of first shoe 542 is generally aligned with outer perimeter 242 of first roller 544. In some embodiments of the present invention, resilient sleeve 234 is sufficiently deformable so that distal surface 244 of first shoe 542 and outer perimeter 242 of first roller 544 can be brought into contact with a single surface. In these embodiments, resilient sleeve 234 is preferably reversibly deformable so that resilient sleeve 234 is capable of biasing first shoe 542 against the single surface while first roller 544 is contacting the single surface.

Distance 246 shown in FIG. 10 may be described as a deformation distance. This deformation distance is the distance which resilient sleeve 234 will deform when first shoe 542 assumes a retracted position in which distal surface 244 of distal portion 240 of first shoe 542 is generally aligned with outer perimeter 242 of first roller 544.

In some useful embodiments of the present invention, first shoe 542 and first roller 544 are dimensioned to provide a desired deformation distance 246. In some useful embodiments of the present invention, deformation distance 246 is selected as a function of a desired magnitude of a bias force to be provided by resilient sleeve 234. For example, distance 246 and the material forming resilient sleeve 234 may be selected so that resilient sleeve 234 provides a desired bias force when collar 236 is moved between a first position and a second position. The first position and the second position being separated by distance 246. In some embodiments of the present invention, the bias force is selected so that sliding contact between distal surface 244 of first shoe 542 and another surface provides a desired friction force.

In some useful embodiments of the present invention, resilient sleeve 234 comprises a reversibly deformable material. For example, resilient sleeve 234 may comprise an elastomeric material. The term elastomeric generally refers to a rubberlike material (e.g., a material which can experience about a 5% deformation and return to the undeformed configuration). Examples of elastomeric materials include rubber (e.g., natural rubber, silicone rubber, nitrile rubber, polysulfide rubber, etc.), thermoplastic elastomer (TPE), butyl, polyurethane, and neoprene.

Figure 11:
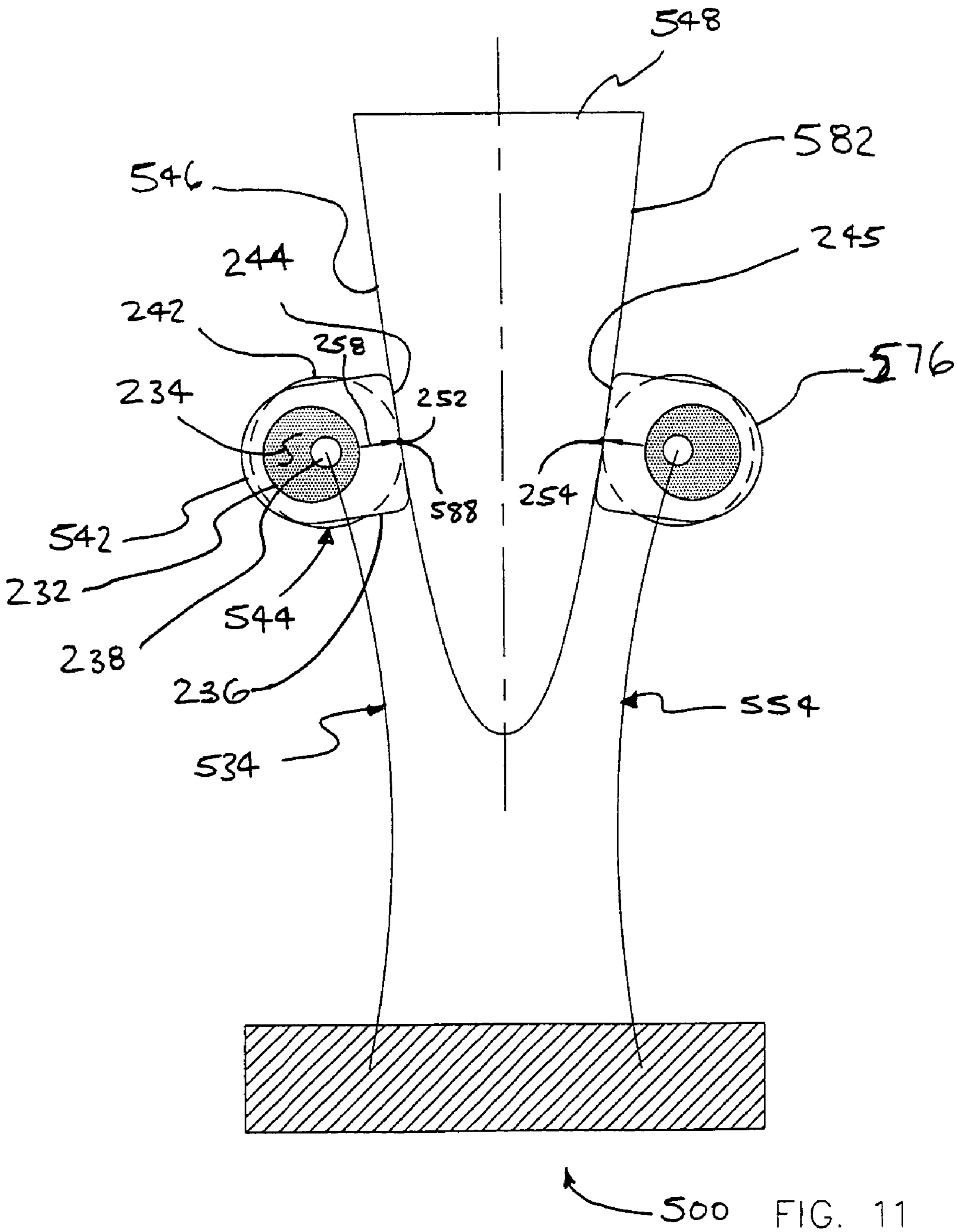
FIG. 11 is a somewhat diagrammatic plan view of a stand including cam shown in the previous figure.

FIG. 11 is a somewhat diagrammatic elevation view of a stand 500 including first spring assembly 534 and second spring assembly 554 shown in the previous figure. In the embodiment of FIG. 11 a first distal surface 244 of first shoe 542 is shown contacting a first cam surface 546 of a cam 548 at a first sliding contact point 252. Also in the embodiment of FIG. 11, a second distal surface 245 of a second shoe 576 is shown contacting a second cam Surface 582 of cam 548 at a second sliding contact point 254.

In FIG. 11, resilient sleeve 234 of first shoe 542 is shown having a deformed shape in which first axle 538 is out of co-axial alignment with hole 232 defined by collar 236 of first shoe 542. In the embodiment of FIG. 11, resilient sleeve 234 has deformed to an extent that allows outer perimeter 242 of first roller 544 to contact first cam surface 546 at a first rolling contact point 588 while first distal surface 244 of first shoe 542 is contacting first cam surface 546 at first sliding contact point 252.

In the embodiment of FIG. 11, first rolling contact point 588 and first sliding contact point 252 are generally aligned with one another. More particularly, in FIG. 11, first rolling contact point 588 and first sliding contact point 252 define a line which is generally perpendicular to the surface of the sheet of paper on which FIG. 11 appears.

In the embodiment of FIG. 11, first shoe 542 is biased against first cam surface 546 by a first bias force 258. In FIG. 11, first bias force 258 is illustrated using an arrow. In some embodiments of the present invention, first bias force 258 is provided by resilient sleeve 234. A desired magnitude of first bias force 258 may be provided, for example, by deforming resilient sleeve 234 by a pre-selected deformation distance. In one advantageous aspect of the present invention, the deformation distance and a material characteristic of the resilient member are selected to provide a pre-determined bias force. In some cases, the predetermined bias force is selected to provide a desired friction force.

Figure 12:
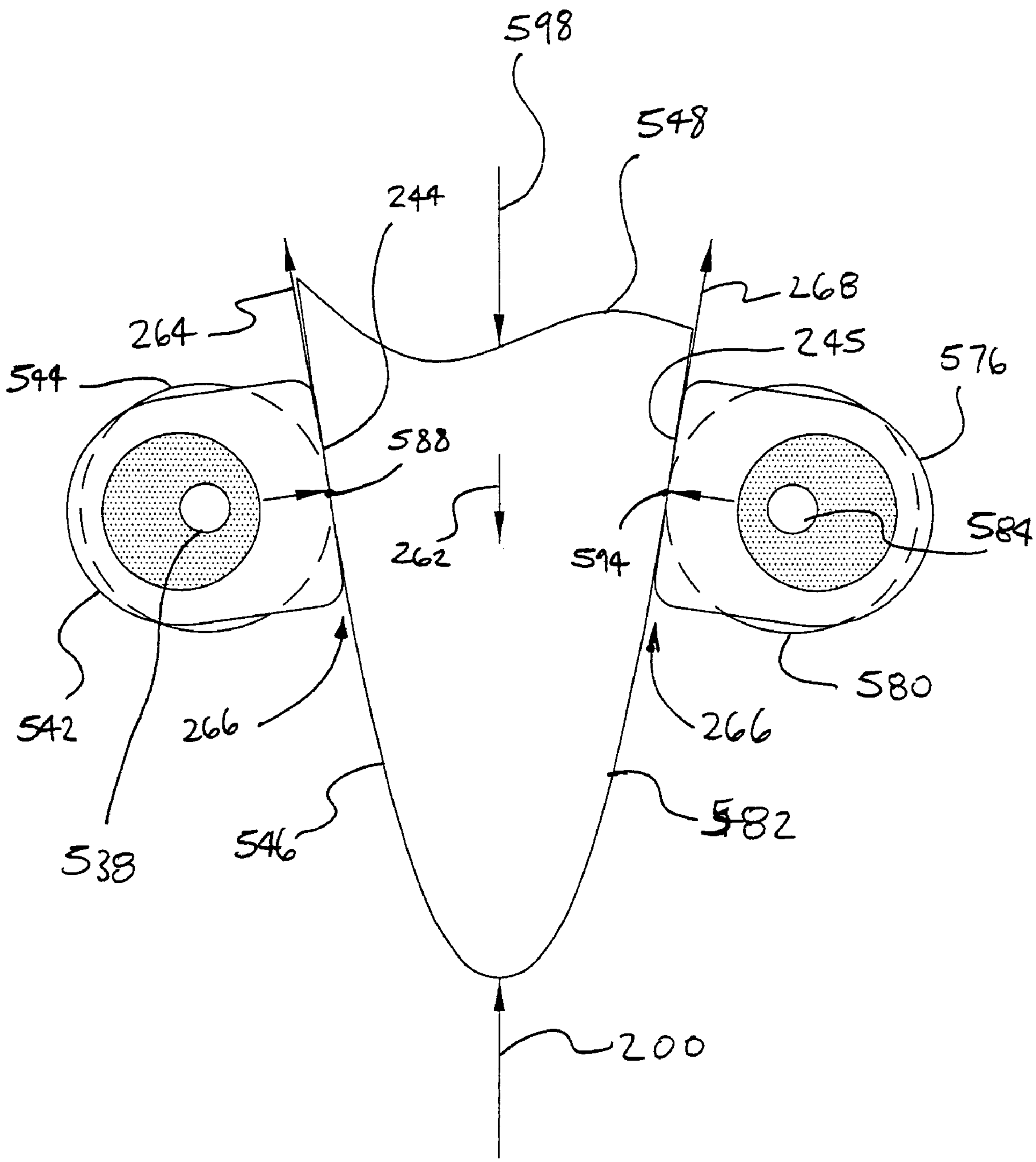
FIG. 12 is a diagrammatic plan view of an assembly including a cam having a first cam Surface.

FIG. 12 is an enlarged diagrammatic elevation view illustrating a portion of stand 500 shown in the previous figure. A first friction force arrow 264 and a second friction force arrow 268 are visible in FIG. 12. First friction force arrow 264 represents the effect of friction at an interface 266 between first distal surface 244 of first shoe 542 and first cam surface 546 of cam 548. Second friction force arrow 268 represents the effect of friction an interface 266 between second distal surface 245 of second shoe 576 and second cam surface 582 of cam 548.

A balancing force 200 and a first load 598 are also illustrated in FIG. 12 using arrows. First load 598 may comprise, for example, the weight of cam 548 and the weight of a load (e.g., an electronic display) coupled to cam 548. Balancing force 200 may comprise a force produced by a spring mechanism of stand 500. In the embodiment of FIG. 12, for example, first roller 544 and second roller 580 cooperate with cam 548 to produce balancing force 200.

In FIG. 12, first roller 544 is shown contacting a first cam surface 546 of cam 548 at a first rolling contact point 588 and a second roller 580 contacts second cam surface 582 at a second rolling contact point 594. In some embodiments of the present invention, the rollers act upon cam 548 to produce a balancing force 200 that is generally equal and opposite to a first load 598. When this is the case, the rollers and the cam tend to remain stationary relative to one another unless another force intervenes.

Balancing force 200, as illustrated with an arrow in FIG. 12, has a magnitude and direction that is generally equal and opposite to first load 598. With reference to FIG. 12, it will be appreciated that the combination of balancing force 200, the first friction force and the second friction force may be capable of supporting a second load that is different from first load 598.

In some exemplary embodiments of the present invention, for example, first load 598 may comprise the weight of a first electronic display and the second load may comprise the weight of a second electronic display that is heavier or lighter than the first display. The weight of the first electronic display and the weight of the second electronic display may be different from one another, for example, due to manufacturing tolerances. When this is the case, a magnitude of the first friction force and the second friction force may be pre-selected to be similar to an expected maximum variation in the weight of the display due to manufacturing tolerances.

By way of a second example, the weight of the first electronic display and the weight of the second electronic display may be different from one another because they comprise different models of electronic display. When this is the case, a magnitude of the friction force may be pre-selected to be similar to an expected maximum variation between the weight of a first model display and the weight of a second model display.

In the embodiment of FIG. 12, a repositioning force 262 is shown acting on cam 548. When repositioning force 262 is greater than the friction forces represented by first friction force arrow 264 and second friction force arrow 268, repositioning force 262 will tend to move cam 548 to a new position relative to first axle 538 and second axle 584. In FIG. 12, repositioning force 262 is shown having a generally downward direction and first friction force arrow 264 and second friction force arrow 268 are shown having generally upward directions. In some embodiments of the present invention, the magnitude of the friction forces are selected to be small enough that the position of a monitor can changed using a single human hand. In some embodiments of the present invention, the magnitude of the friction forces are selected to be small enough that the position of the monitor can be changed using a single human finger.

Figure 13:
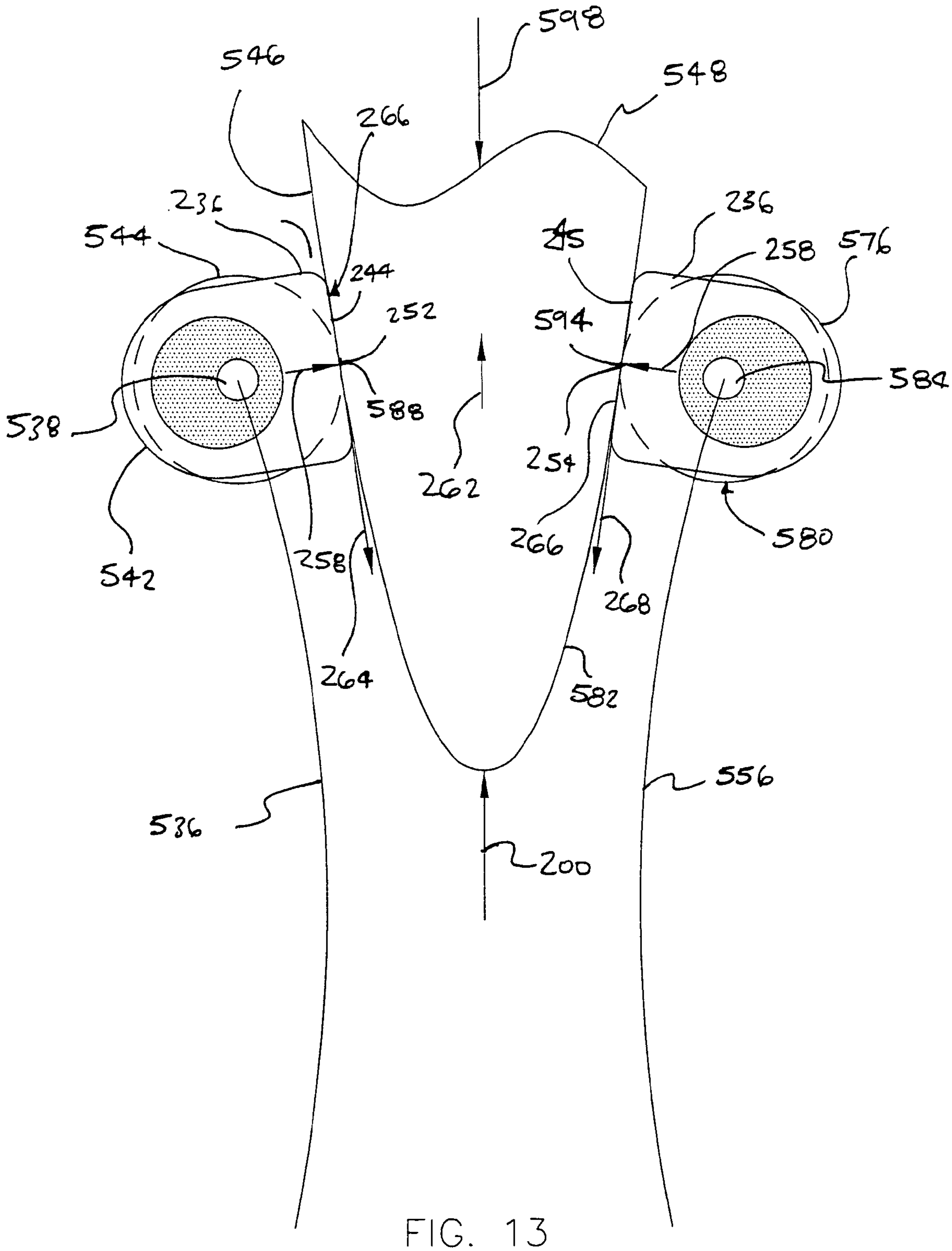
FIG. 13 is a diagrammatic plan view of an assembly including a cam having a first cam surface.

FIG. 13 is a diagrammatic plan view of an assembly including a cam 548 having a first cam surface 546. In the embodiment of FIG. 13 a first distal surface 244 of a collar 236 of a first shoe 542 is shown contacting first cam surface 546 of cam 548 at a first sliding contact point 252. Also in the embodiment of FIG. 13, a second distal surface 245 of a collar 236 of a second shoe 576 is shown contacting a second cam surface 582 of cam 548 at a second sliding contact point 254. In the embodiment of FIG. 13, first shoe 542 is biased against first cam surface 546 by a first bias force 258 and second shoe 576 is biased against second cam surface 582 of cam 548 by a second bias force 258. Each bias force 258 is illustrated using an arrow in FIG. 13.

In FIG. 13, a first roller 544 is shown contacting a first cam surface 546 of cam 548 at a first rolling contact point 588 and a second roller 580 contacts second cam surface 582 at a second rolling contact point 594. In the embodiment of FIG. 13, first roller 544 is urged against first cam surface 546 of cam 548 by a first spring 536 and second roller 580 is urged against second cam surface 582 by a second spring 556. In some embodiments of the present invention, the rollers act upon cam 548 to produce a balancing force 200 that is generally equal and opposite to a first load 598. When this is the case, the rollers and the cam tend to remain stationary relative to one another unless an outside force intervenes.

Balancing force 200, as illustrated with an arrow in FIG. 13, has a magnitude and direction that is generally equal and opposite to first load 598. A first friction force arrow 264 and a second friction force arrow 268 are also visible in FIG. 13. First friction force arrow 264 represents the effect of friction at an interface 266 between first distal surface 244 of first shoe 542 and first cam surface 546 of cam 548. Second friction force arrow 264 represents the effect of friction an interface 266 between second distal surface 245 of second shoe 576 and second cam surface 582 of cam 548.

In some embodiments of the present invention, the magnitude of the friction forces represented by first friction force arrow 264 and second friction force 268 are selected so as to compensate for a predicted non-linearity in the behavior of one or more springs. In some embodiments of the present invention, the magnitude of the friction forces represented by first friction force arrow 264 and second friction force 268 are selected to be sufficiently large to prevent relative movement between a head and a base of a stand when a characteristic of one or more springs (e.g., a spring constant) varies over time. For example, the magnitude of the friction forces may be selected so as to be sufficiently large to prevent relative movement between the head and the base when a material of one or more springs creeps over time.

In the embodiment of FIG. 13, a repositioning force 262 is shown acting on cam 548. When repositioning force 262 is greater than the friction forces represented by first friction force arrow 264 and second friction force arrow 268, repositioning force 262 will tend to move cam 548 to a new position relative to first axle 538 and second axle 584. In FIG. 13, repositioning force 262 is shown having a generally upwardly direction and friction force arrow 264 and second friction force arrow 268 are shown having generally downward directions. In some embodiments of the present invention, the magnitude of the friction forces is small enough that the position of a monitor can changed using a single human hand. In some embodiments of the present invention, the magnitude of the friction force is small enough that the position of the monitor can be changed using a single human finger.

Figure 14:
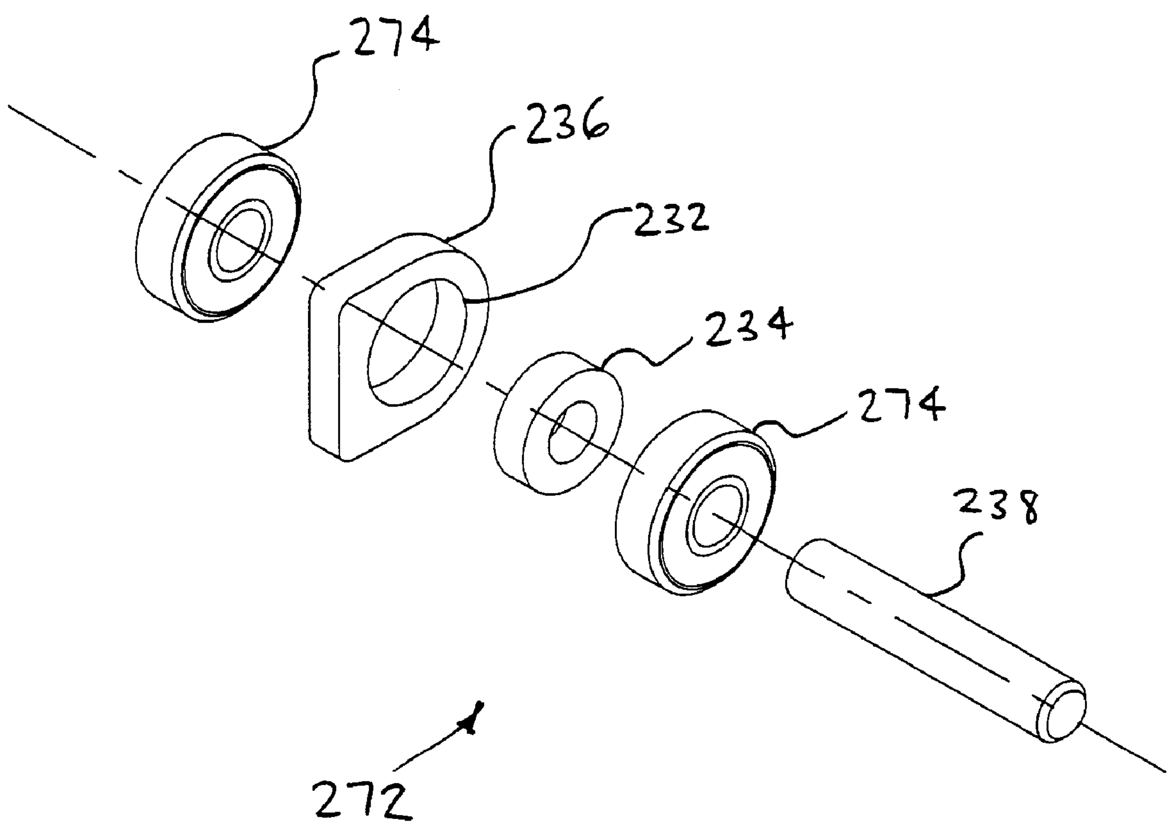
FIG. 14 is an exploded view of an axle assembly in accordance with an exemplary embodiment of the present invention.

FIG. 14 is an exploded view of an axle assembly 272 in accordance with an exemplary embodiment of the present invention. The assembly of FIG. 14 includes an axle 238 and a collar 236. In FIG. 14 it may be appreciated that collar 236 defines a hole 232 that is dimensioned to receive a resilient sleeve 234. In the embodiment of FIG. 14, collar 236 and resilient sleeve 234 are disposed between two of rollers 274.

Figure 15:
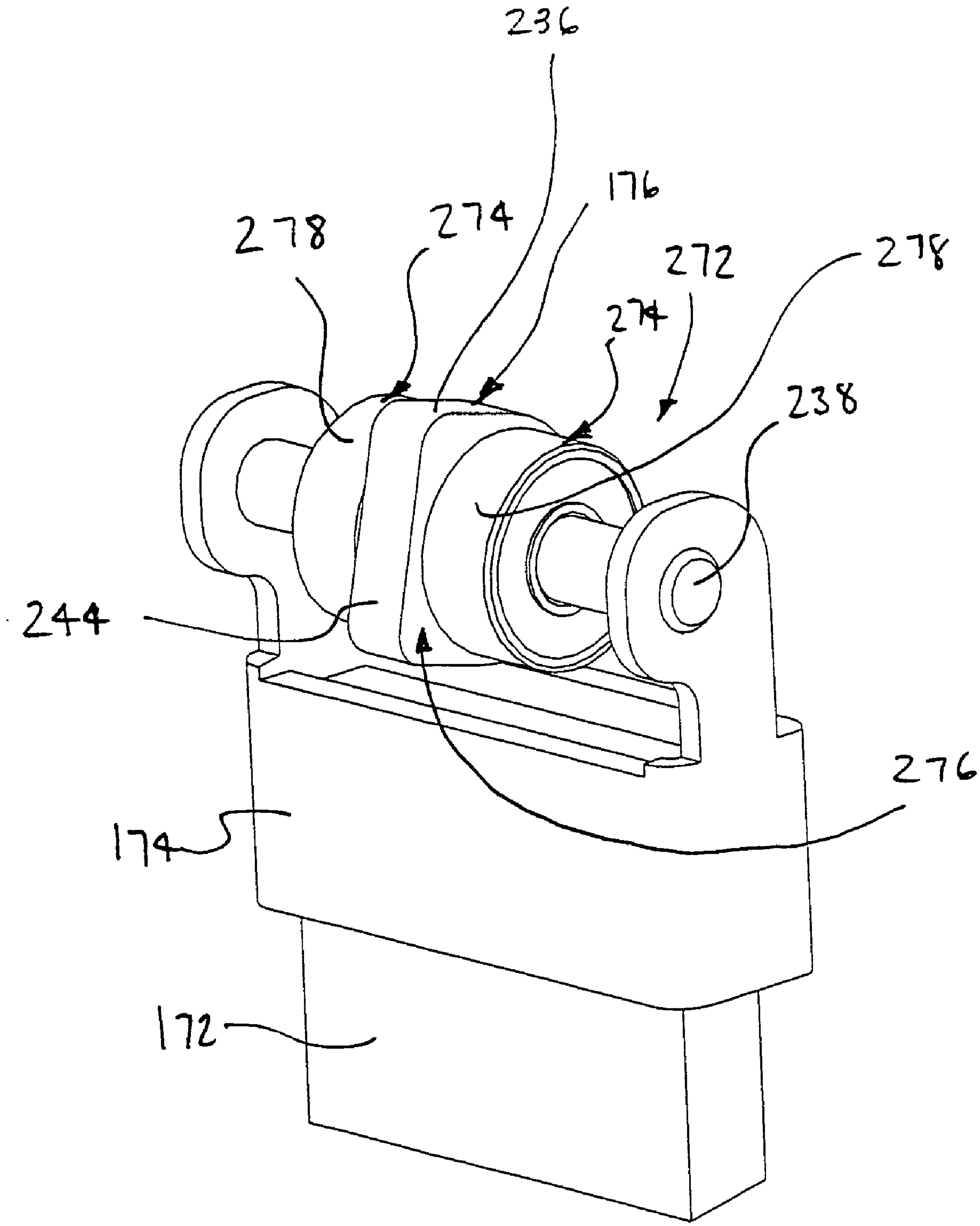
FIG. 15 is a perspective view of an assembly including axle assembly shown in the previous figure.

FIG. 15 is a perspective view of an assembly including axle assembly 272 shown in the previous figure. The assembly of FIG. 15 includes an axle 238 that is coupled to a spring 172 by a bracket 174. A plurality of rollers 274 are disposed about axle 238. In the embodiment of FIG. 15, a shoe 176 is interposed between the rollers 274. In the embodiment of FIG. 15, shoe 176 comprises a collar 236 having a distal surface 244. In FIG. 15 it may be appreciated that a portion 276 of collar 236 extends beyond a periphery 278 of each roller 274.

Figure 16:
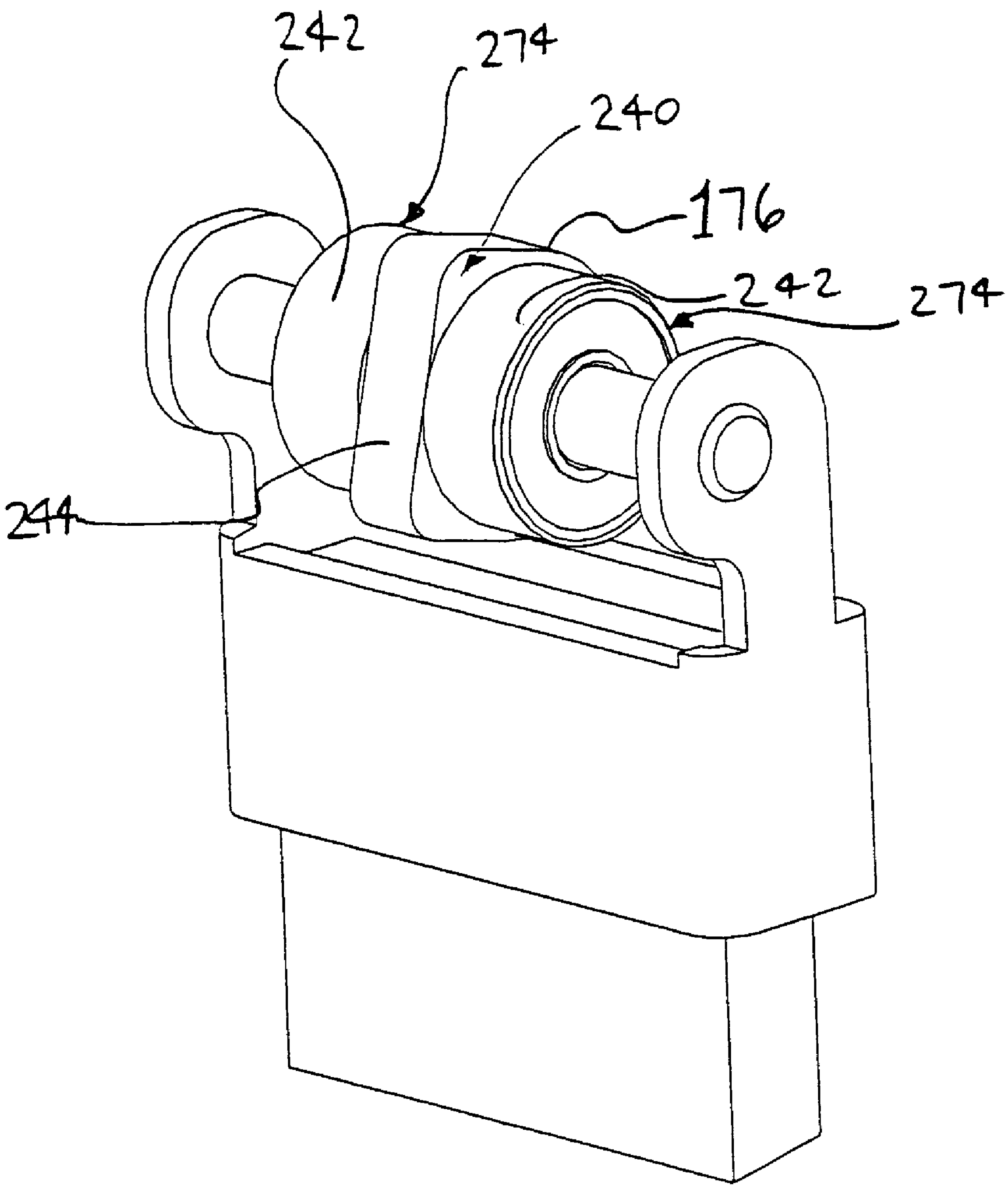
FIG. 16 is a perspective view of an assembly in accordance with the present invention.

FIG. 16 is an additional perspective view of the assembly shown in the previous figure. In the embodiment of FIG. 16, a distal surface 244 of distal portion 240 of shoe 176 is generally aligned with an outer perimeter 242 of each roller 274.

Figure 17:
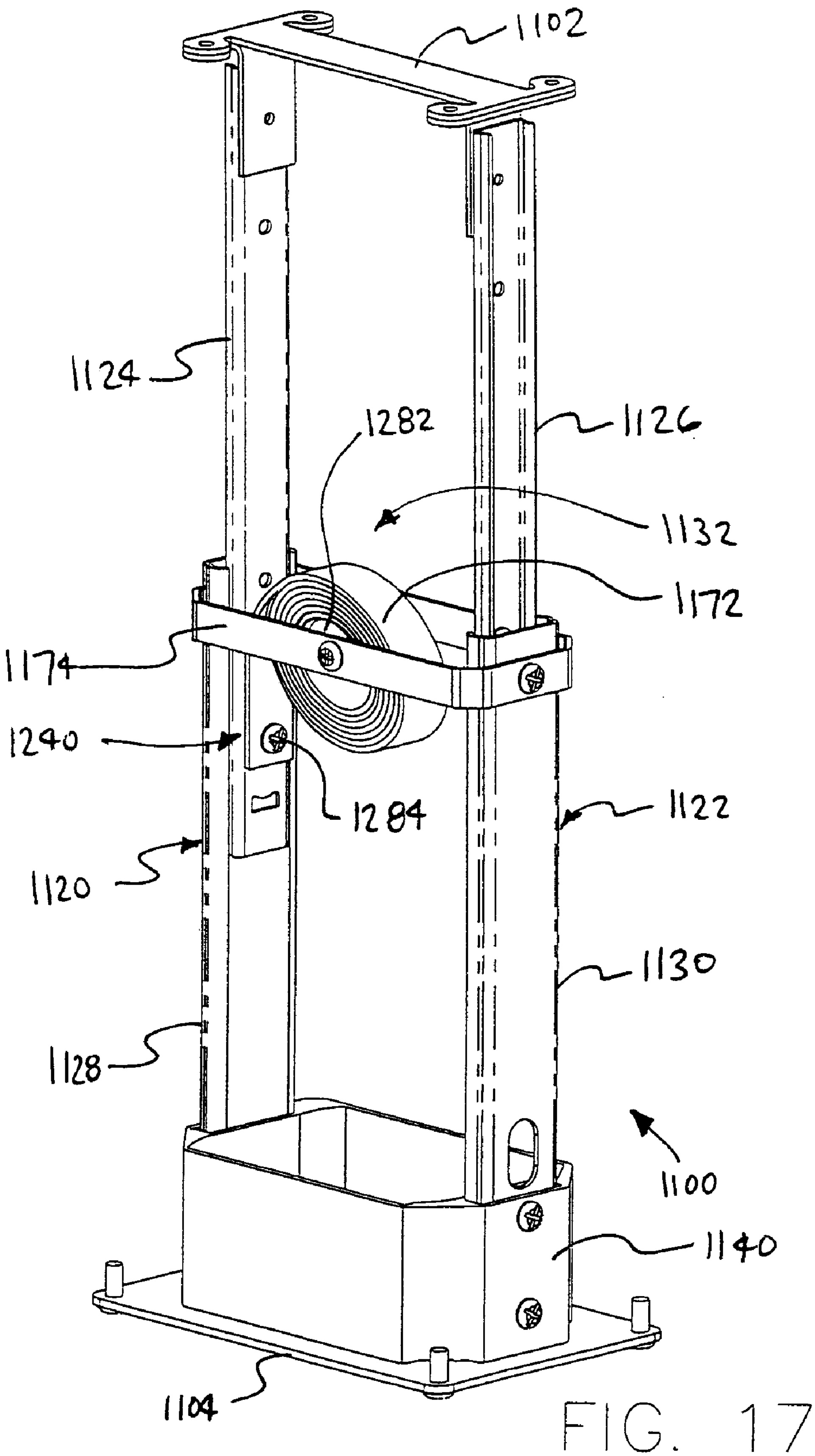
FIG. 17 is a perspective view of a stand in accordance with an additional exemplary embodiment of the present invention.

FIG. 17 is a perspective view of a stand 1100 in accordance with an additional exemplary embodiment of the present invention. Stand 1100 comprises a head 1102 that is slidingly coupled to a base 1104 by a first slide 1120 and a second slide 1122. In the embodiment of FIG. 17, head 1102 is connected to a first inner rail 1124 of first slide 1120 and a second inner rail 1126 of second slide 1122. A first outer rail 1128 of first slide 1120 and a second outer rail 1130 of second slide 1122 are connected to base 1104 by a mounting block 1140.

Stand 1100 of FIG. 17 includes a spring mechanism 1132 that is coupled between base 1104 and head 1102 for providing a balancing force. In the embodiment of FIG. 17, spring mechanism 1132 comprises a constant force spring 1172 that is disposed about a mandrel 1282. In the embodiment of FIG. 17, mandrel 1282 is rotatably supported by a bracket 1174. With reference to FIG. 17, it may be appreciated that bracket 1174 is disposed about and fixed to first outer rail 1128 and second outer rail 1130. In FIG. 17, a distal portion 1240 of constant force spring 1172 is shown fixed to first inner rail 1124 by a fastener 1284.

Figure 18:
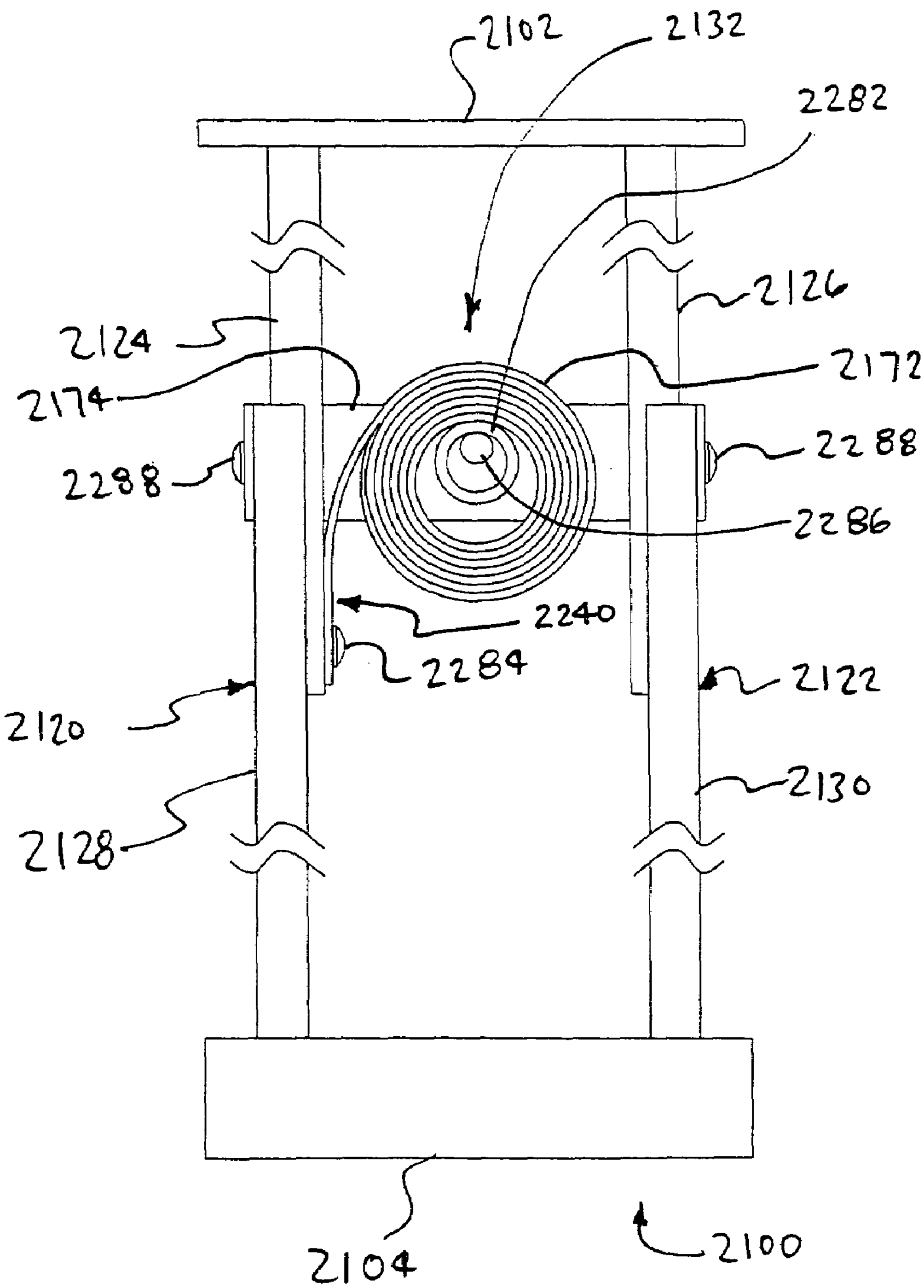
FIG. 18 is a front view of a stand in accordance with an additional exemplary embodiment of the present invention.

FIG. 18 is a front view of a stand 2100 in accordance with an additional exemplary embodiment of the present invention. Stand 2100 comprises a head 2102 that is connected to a first inner rail 2124 of a first slide 2120 and a second inner rail 2126 of a second slide 2122. First slide 2120 and second slide 2122 also comprise a first outer rail 2128 and a second outer rail 2130 respectively. In the embodiment of FIG. 18, first outer rail 2128 and second outer rail 2130 are connected to a base 2104 of stand 2100. In some useful embodiments of the present invention, first slide 2120 and second slide 2122 slidingly couple head 2102 to base 2104.

A spring mechanism 2132 of stand 2100 may advantageously provide a balancing force between base 2104 and head 2102. In the embodiment of FIG. 18, spring mechanism 2132 comprises a constant force spring 2172 that is disposed about a mandrel 2282. In the embodiment of FIG. 18, mandrel 2282 is rotatably supported by a shaft 2286 that is fixed to a bracket 2174. With reference to FIG. 18, it may be appreciated that bracket 2174 is fixed to first outer rail 2128 and second outer rail 2130 by a plurality of fasteners 2288. In FIG. 18, a distal portion 2240 of constant force spring 2172 is fixed to first inner rail 2124 by a fastener 2284.

Figure 19:
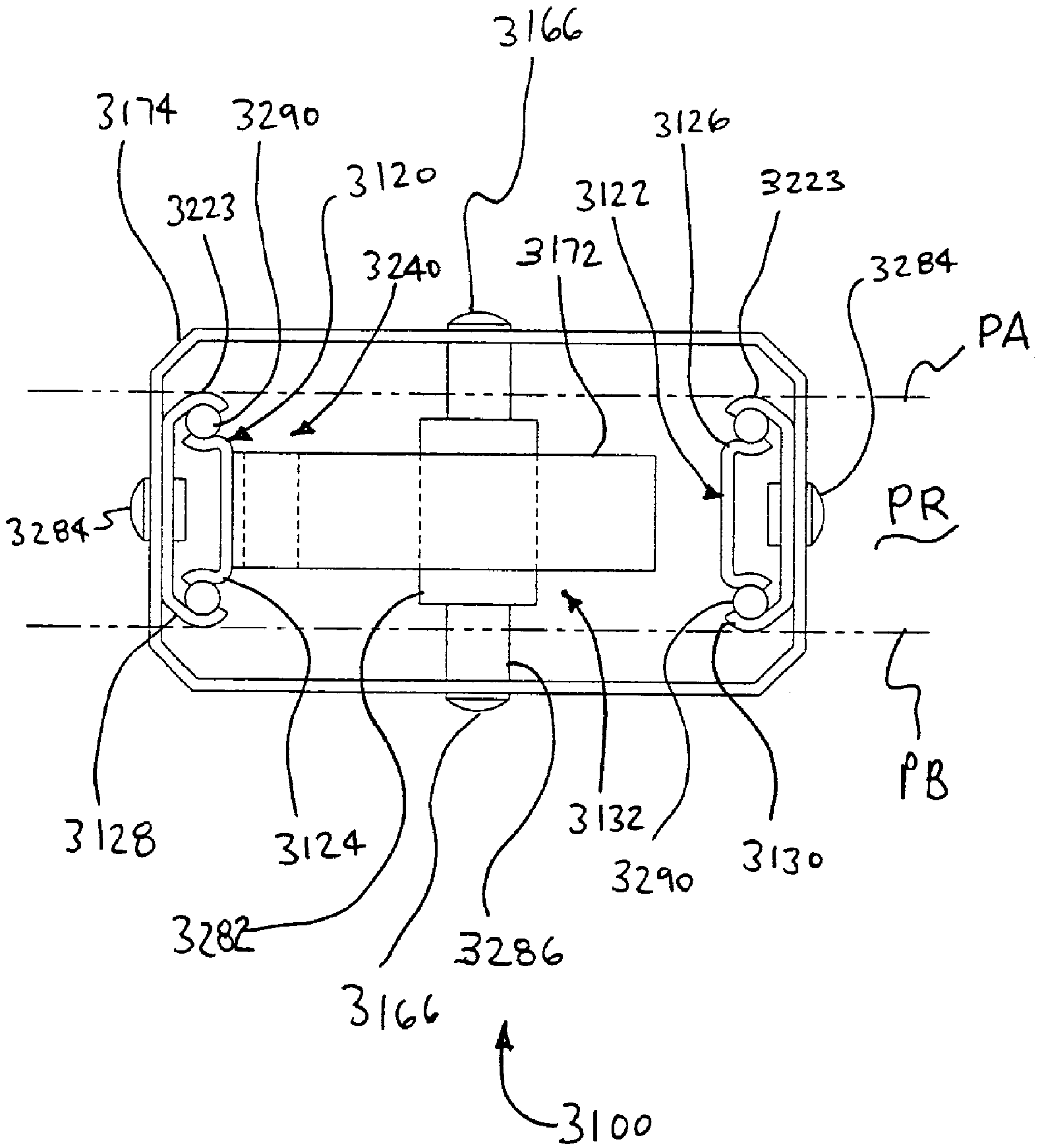
FIG. 19 is a top view of a stand in accordance with an additional exemplary embodiment of the present invention.

FIG. 19 is a top view of a stand 3100 in accordance with an additional exemplary embodiment of the present invention. Stand 3100 of FIG. 19 comprises a first slide 3120 including a first inner rail 3124 and a first outer rail 3128. With reference to FIG. 19, it may be appreciated that a plurality of balls 3290 are disposed between first inner rail 3124 and a first outer rail 3128. Stand 3100 also comprises a second slide 3122 including a second inner rail 3126, a second outer rail 3130 and a plurality of balls 3290 disposed therebetween.

In FIG. 19, a bracket 3174 is shown disposed about first slide 3120 and second slide 3122. Bracket 3174 is fixed to first outer rail 3128 of first slide 3120 by a fastener 3284. A second fastener 3284 is shown fixing second outer rail 3130 to bracket 3174. In the embodiment of FIG. 19, a shaft 3286 is fixed to bracket 3174 by a plurality of fasteners 3166. In the embodiment of FIG. 19, shaft 3286 rotatably supports a mandrel 3282 of a spring mechanism 3132. In the embodiment of FIG. 19, spring mechanism 3132 also comprises a constant force spring 3172. A distal portion 3240 of constant force spring 3172 is shown fixed to first inner rail 3124 in FIG. 19. Spring mechanism 3132 may advantageously provide a balancing force between first inner rail 3124 and first outer rail 3128 in the embodiment of FIG. 19.

With reference to FIG. 19, it will be appreciated that an outside surface 3223 of first outer rail 2128 and an outside surface 3223 of second outer rail 3130 define a first reference plane PA and a second reference plane PB. In the embodiment of FIG. 19, spring mechanism 3132 is disposed between first reference plane PA and second reference plane PB. Also in the embodiment of FIG. 19, spring mechanism 3132 is disposed within a projection PR defined by outside surface 3223 of first outer rail 2128. In FIG. 19, projection PR extends between first reference plane PA and second reference plane PB.

Figure 20:
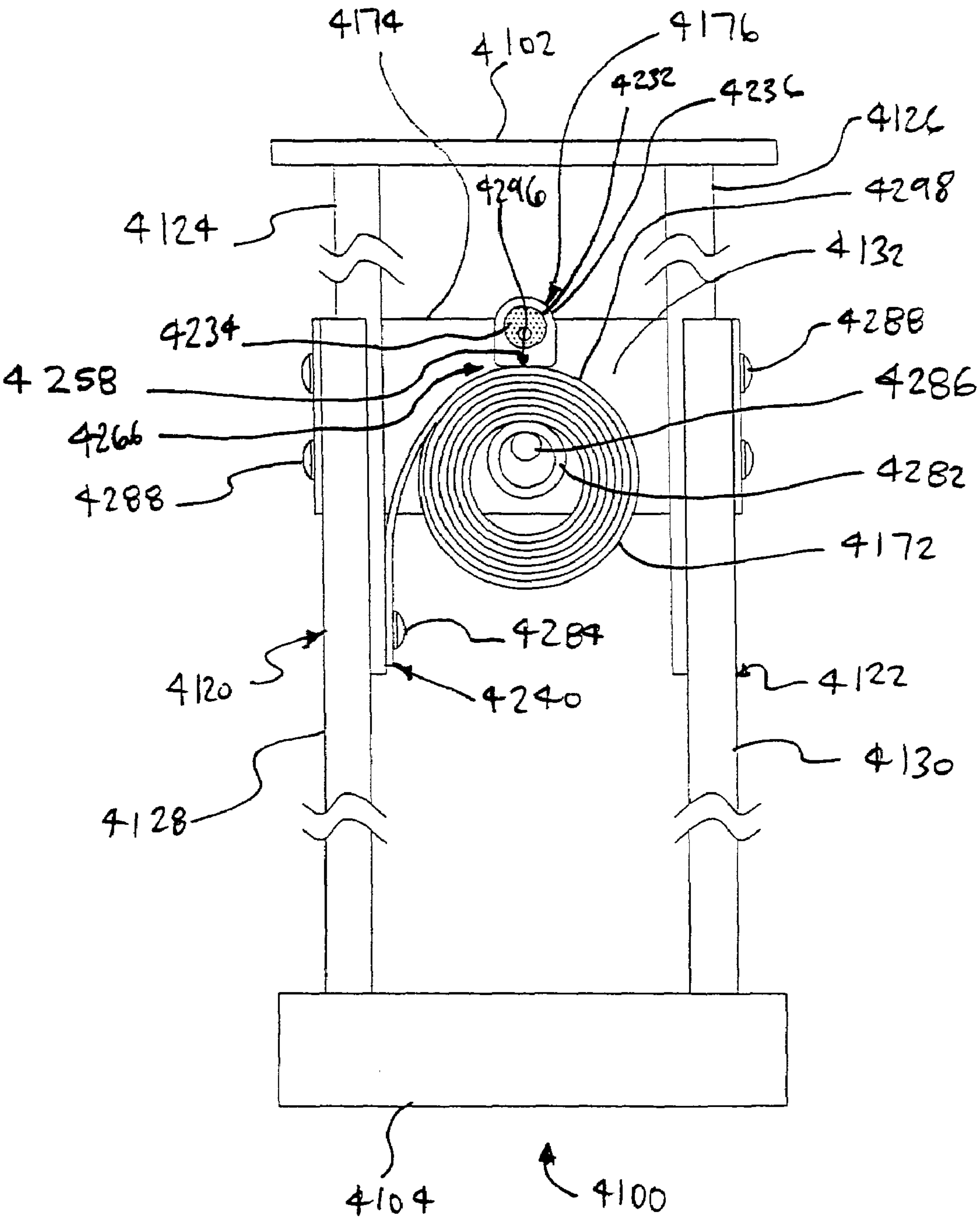
FIG. 20 is a front view of a stand in accordance with an additional exemplary embodiment of the present invention.

FIG. 20 is a front view of a stand 4100 in accordance with an additional exemplary embodiment of the present invention. Stand 4100 comprises a head 4102 that is slidingly coupled to a base 4104. Head 4102 and base 4104 are both connected to a first slide 4120 and a second slide 4122 in the embodiment of FIG. 20. A spring mechanism 4132 is coupled between a first inner rail 4124 of first slide 4120 and a first outer rail 4128 of first slide 4120 so that spring mechanism 4132 provides a balancing force between base 4104 and head 4102.

In the embodiment of FIG. 20, spring mechanism 4132 comprises a constant force spring 4172 that is disposed about a mandrel 4282. In the embodiment of FIG. 20, mandrel 4282 is supported by a shaft 4286 that is fixed to a bracket 4174. With reference to FIG. 20, it may be appreciated that bracket 4174 is fixed to first outer rail 4128 and second outer rail 4130 by a plurality of fasteners 4288. In FIG. 20, a distal portion 4240 of constant force spring 4172 is fixed to first inner rail 4124 by a fastener 4284.

Stand 4100 of FIG. 20 also includes a shoe 4176 that is supported by a pin 4296. Pin 4296 is fixed to bracket 4174 in the embodiment of FIG. 20. With reference to FIG. 20, it may be appreciated that shoe 4176 contacts an outer surface 4298 of constant force spring 4172. In the embodiment of FIG. 20, first shoe 4142 comprise a collar 4236 defining a hole 4232 which receives a resilient sleeve 4234. In the embodiment of FIG. 20, resilient sleeve 4234 has a resting shape in which hole 4232 of collar 4236 and pin 4296 are substantially coaxially aligned with one another. In FIG. 20, however, resilient sleeve 4234 is shown having a shape in which resilient sleeve 4234 is deformed. When resilient sleeve 4234 assumes a deformed shape, resilient sleeve 4234 may act to bias collar 4236 against outer surface 4298 of constant force spring 4172.

A bias force 4258 is illustrated using an arrow in FIG. 20. In the embodiment of FIG. 20, shoe 4176 is biased against outer surface 4298 of constant force spring 4172 by bias force 4258. As described above, bias force 4258 may be provided by resilient sleeve 4234 in some embodiments of the present invention. A desired magnitude of bias force 4258 may be provided, for example, by deforming resilient sleeve 4234 by a pre-selected deformation distance. In one advantageous aspect of the present invention, the deformation distance and a material characteristic of resilient sleeve 4234 are selected to provide a pre-determined bias force. In some cases, the predetermined bias force is selected to provide a desired friction force.

In some cases, bias force 4258 is selected so as to provide a friction force having a desired magnitude at an interface 4266 between shoe 4176 and outer surface 4298 of constant force spring 4172. For example, the magnitude of the friction force at interface 4266 may be selected so as to compensate for a predicted non-linearity in the behavior of constant force spring 4172. In some embodiments of the present invention, the magnitude of the friction force at interface 4266 may be selected to be sufficiently large to prevent relative movement between the head and the base when a characteristic of constant force spring 4172 (e.g., a spring constant) varies over time.

In the embodiment of FIG. 20, head 4102 is connected to both first inner rail 4124 of first slide 4120 and second inner rail 4126 of second slide 4122. Also in the embodiment of FIG. 20, first outer rail 4128 and second outer rail 4130 are connected to a base 4104 of stand 4100. This arrangement allows first slide 4120 and second slide 4122 to slidingly couple head 4102 to base 4104. In the embodiment of FIG. 20, the head and the base are free of any mechanical interlocking preventing motion parallel to an axis of the slides so that the head and the base may be moved relative to one another by applying a single repositioning force which overcomes the friction force at interface 4266.

In some embodiments of the present invention, the magnitude of the friction force is small enough that the position of head 4102 can be changed using a single human hand. In some embodiments of the present invention, the magnitude of the friction force is small enough that the position of head 4102 can be changed using a single human finger.

Figure 21:
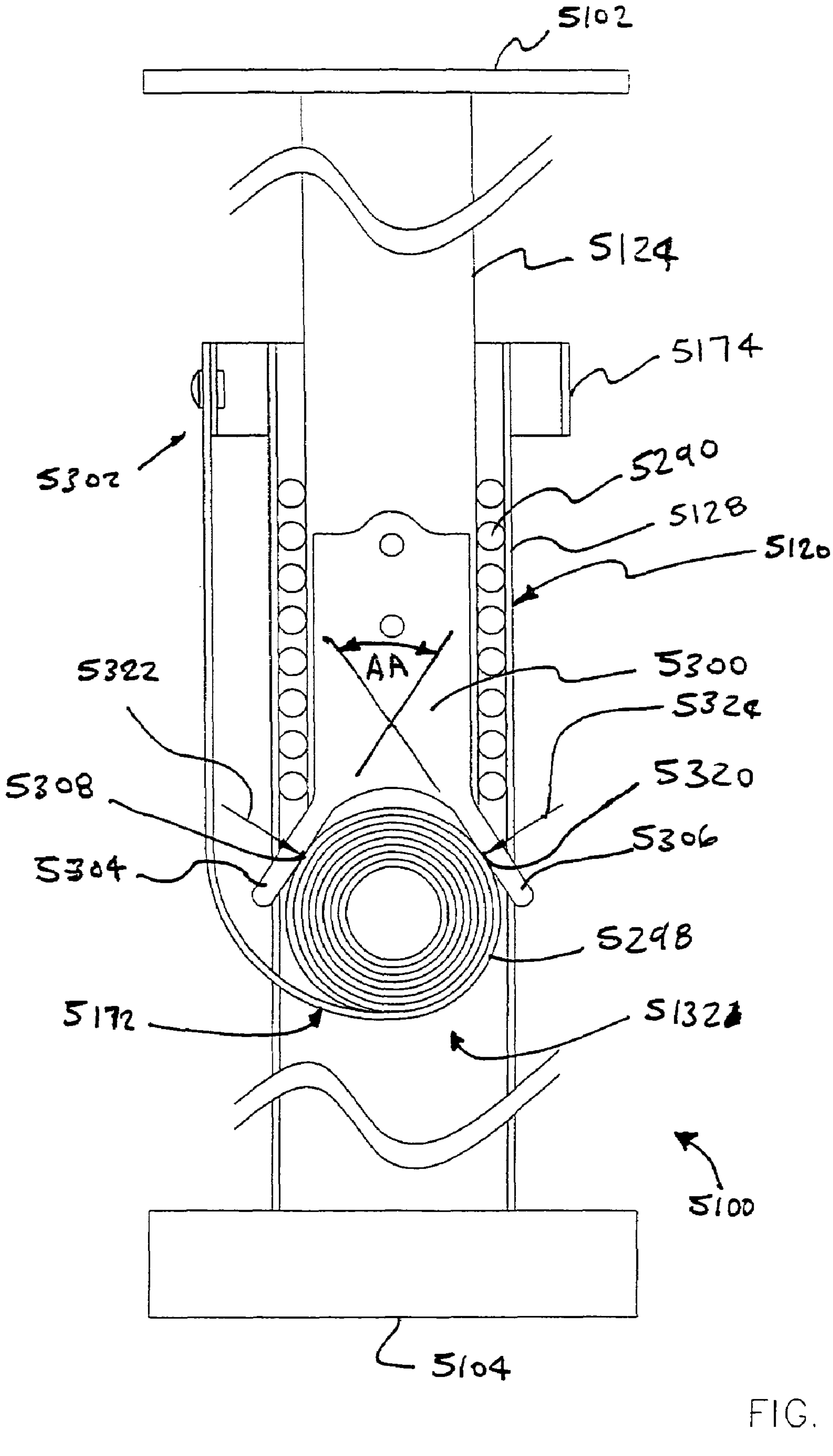
FIG. 21 is a front side view showing a stand in accordance with an exemplary embodiment of the present invention.

FIG. 21 is a front side view showing a stand 5100 in accordance with an exemplary embodiment of the present invention. Stand 5100 comprises a head 5102 and a base 5104. Head 5102 is slidingly coupled to base 5104 by a first slide 5120. A spring mechanism 5132 produces a balancing force between head 5102 and base 5104. In the embodiment of FIG. 21, spring mechanism 5132 comprises a constant force spring 5172 and a shoe 5300. In FIG. 21, it may be appreciated that shoe 5300 is connected to a first inner rail 5124 of first slide 5120. A distal end 5302 of constant force spring 5172 is fixed to bracket 5174 which is connected to first outer rail 5128. With reference to FIG. 21, it may be appreciated that a plurality of balls 5290 are disposed between first inner rail 5124 and first outer rail 5128.

Shoe 5300 comprises a first arm 5304 and a second arm 5306. First arm 5304 and second arm 5306 contact an outer surface 5298 of constant force spring 5172 at a first tangent point 5308 and a second tangent point 5320. In FIG. 21, a first normal force 5322 is shown being applied to outer surface 5298 of spring 5172 at first tangent point 5308. A second normal force 5324 is shown acting on outer surface 5298 of constant force spring 5172 at second point 5326 in FIG. 21.

An included angle AA defined by first arm 5304 and second arm 5306 is shown in FIG. 21. In some embodiments of the present invention, the magnitude of included angle AA is preselected to provide a desired magnitude of friction force between shoe 5300 and outer surface 5298 of constant force spring 5172.

Figure 22:
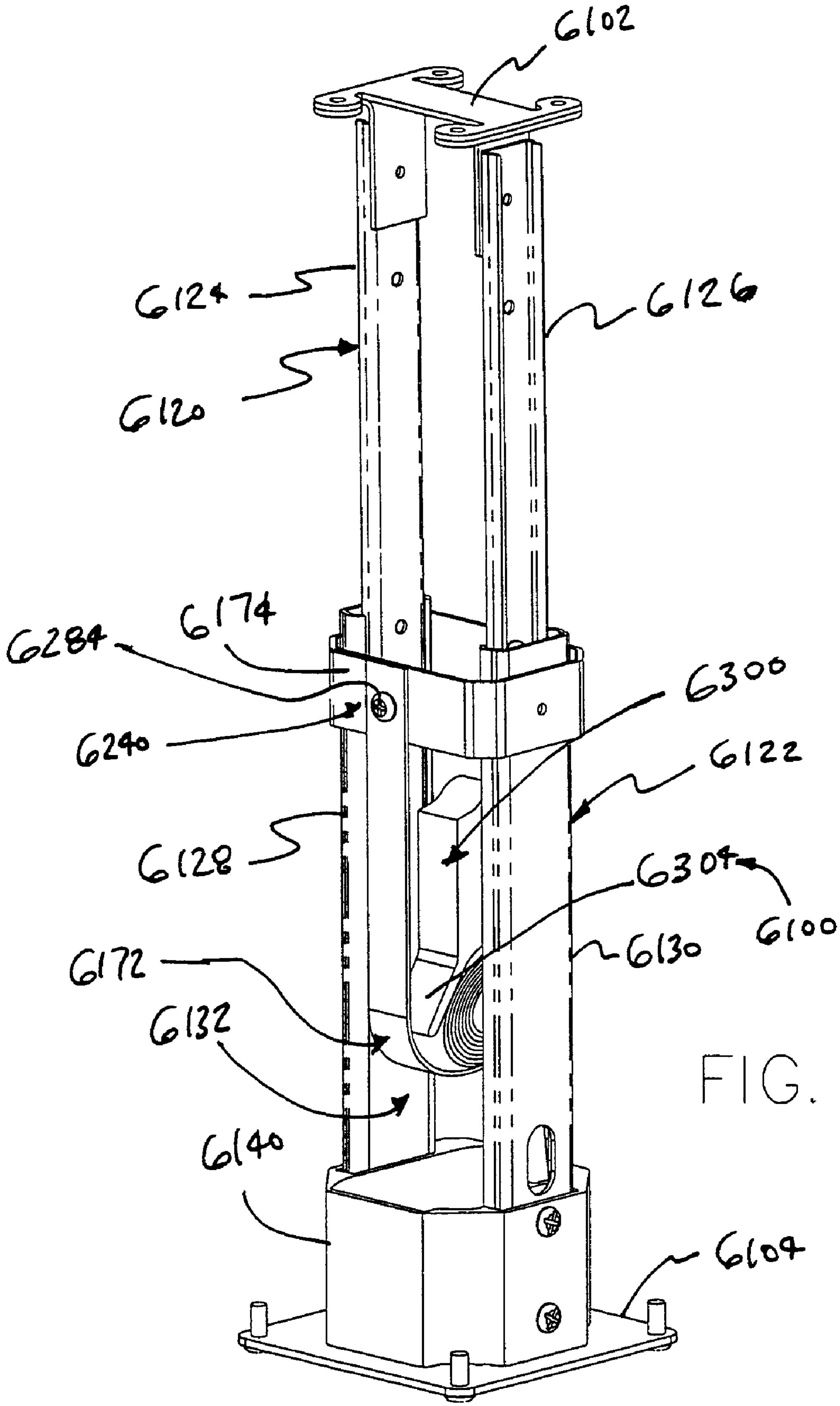
FIG. 22 is a perspective view of a stand in accordance with an additional exemplary embodiment of the present invention.

FIG. 22 is a perspective view of a stand 6100 in accordance with an additional exemplary embodiment of the present invention. Stand 6100 comprises a head 6102 that is slidingly coupled to a base 6104 by a first slide 6120 and a second slide 6122. In the embodiment of FIG. 22, head 6102 is connected to a first inner rail 6124 of first slide 6120 and a second inner rail 6126 of second slide 6122. A first outer rail 6128 of first slide 6120 and a second outer rail 6130 of second slide 6122 are connected to base 6104 by a mounting block 6140.

Stand 6100 of FIG. 22 includes a spring mechanism 6132 that is coupled between base 6104 and head 6102 for providing a balancing force. In the embodiment of FIG. 22, spring mechanism 6132 comprises a constant force spring 6172 having a distal portion 6240 that is connected to first outer rail 6128 by a bracket 6174. In FIG. 22, distal portion 6240 of constant force spring 6172 is shown fixed to bracket 6174 by a fastener 6284. Spring mechanism 6132 also includes a shoe 6300 including a first arm 6304.

Figure 23:
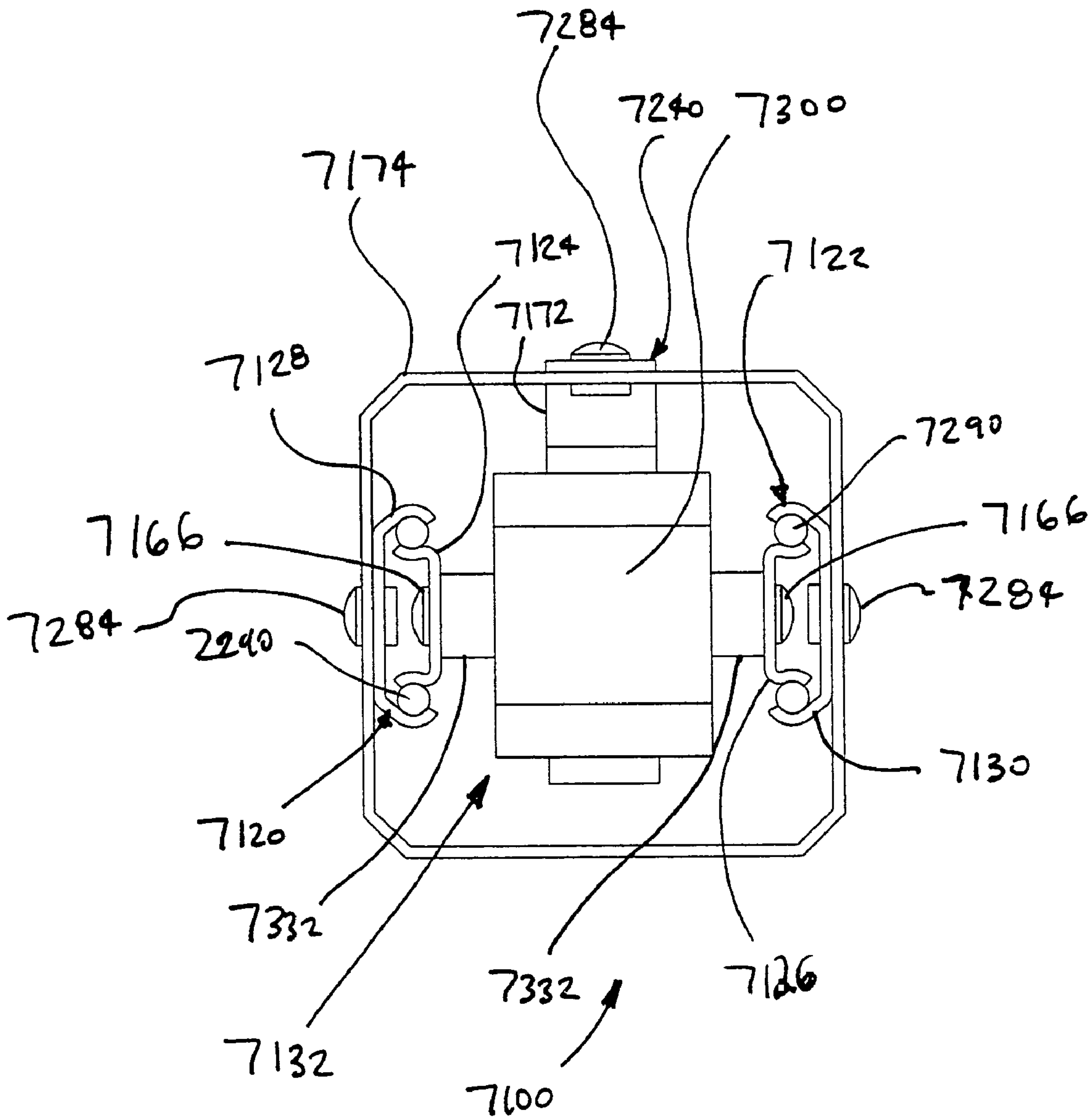
FIG. 23 is a top view of a stand in accordance with an additional exemplary embodiment of the present invention.

FIG. 23 is a top view of a stand 7100 in accordance with an additional exemplary embodiment of the present invention. Stand 7100 of FIG. 23 comprises a first slide 7120 including a first inner rail 7124 and a first outer rail 7128. With reference to FIG. 23, it may be appreciated that a plurality of balls 7290 are disposed between first inner rail 7124 and first outer rail 7128. Stand 7100 also comprises a second slide 7122 including a second inner rail 7126, a second outer rail 7130 and a plurality of balls 7290 disposed therebetween.

With continuing reference to FIG. 23, it will be appreciated that a shoe 7300 of a spring mechanism 7132 is fixed to first inner rail 7124 and second inner rail 7126 by a plurality of spacers 7332 and fasteners 7166. Spring mechanism 7132 also includes a constant force spring 7172 having a distal portion 7240 that is fixed to a bracket 7174 by a fastener 7284. In FIG. 23, bracket 7174 is shown disposed about first slide 7120 and second slide 7122 Bracket 7174 is fixed to first outer rail 7128 of first slide 7120 by a fastener 7284. A second fastener 7284 is shown fixing second outer rail 7130 to bracket 7174.

Figure 24:
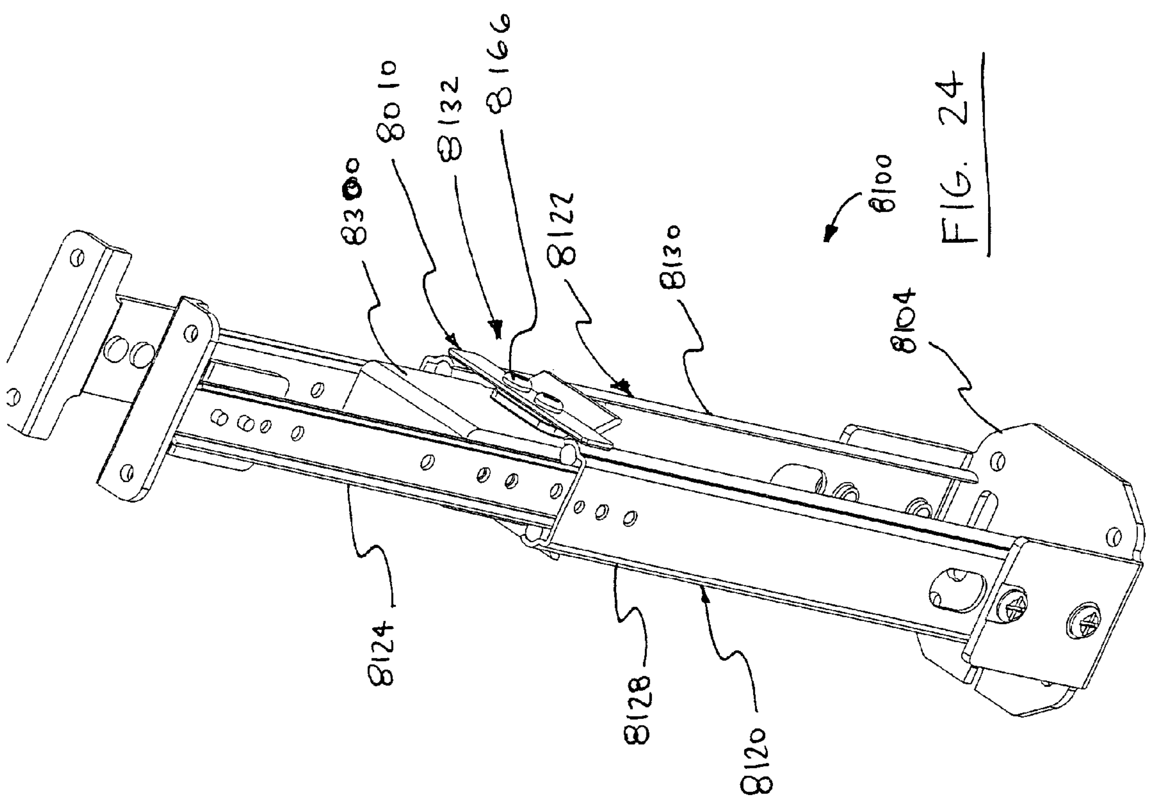
FIG. 24 is a perspective view of a stand in accordance with an additional exemplary embodiment of the present invention.

FIG. 24 is a perspective view of a stand 8100 in accordance with an additional exemplary embodiment of the present invention. Stand 8100 comprises a first slide 8120 and a second slide 8122. A first outer rail 8128 of first slide 8120 and a second outer rail 8130 of second slide 8122 are connected to a base 8104. Stand 8100 of FIG. 24 includes a spring mechanism 8132 that is coupled between first outer rail 8128 of first slide 8120 and a first inner rail 8124 of first slide 8120 for providing a balancing force therebetween.

In the embodiment of FIG. 24, spring mechanism 8132 comprises a shoe 8300 and a constant force spring that is not visible in FIG. 24. Stand 8100 of FIG. 24 also includes a friction pad 8010 that is fixed to shoe 8300 using a plurality fasteners 8166. In FIG. 24, friction pad 8010 is shown contacting first outer rail 8128 of first slide 8120 and second outer rail 8130 of second slide 8122.

Figure 25:
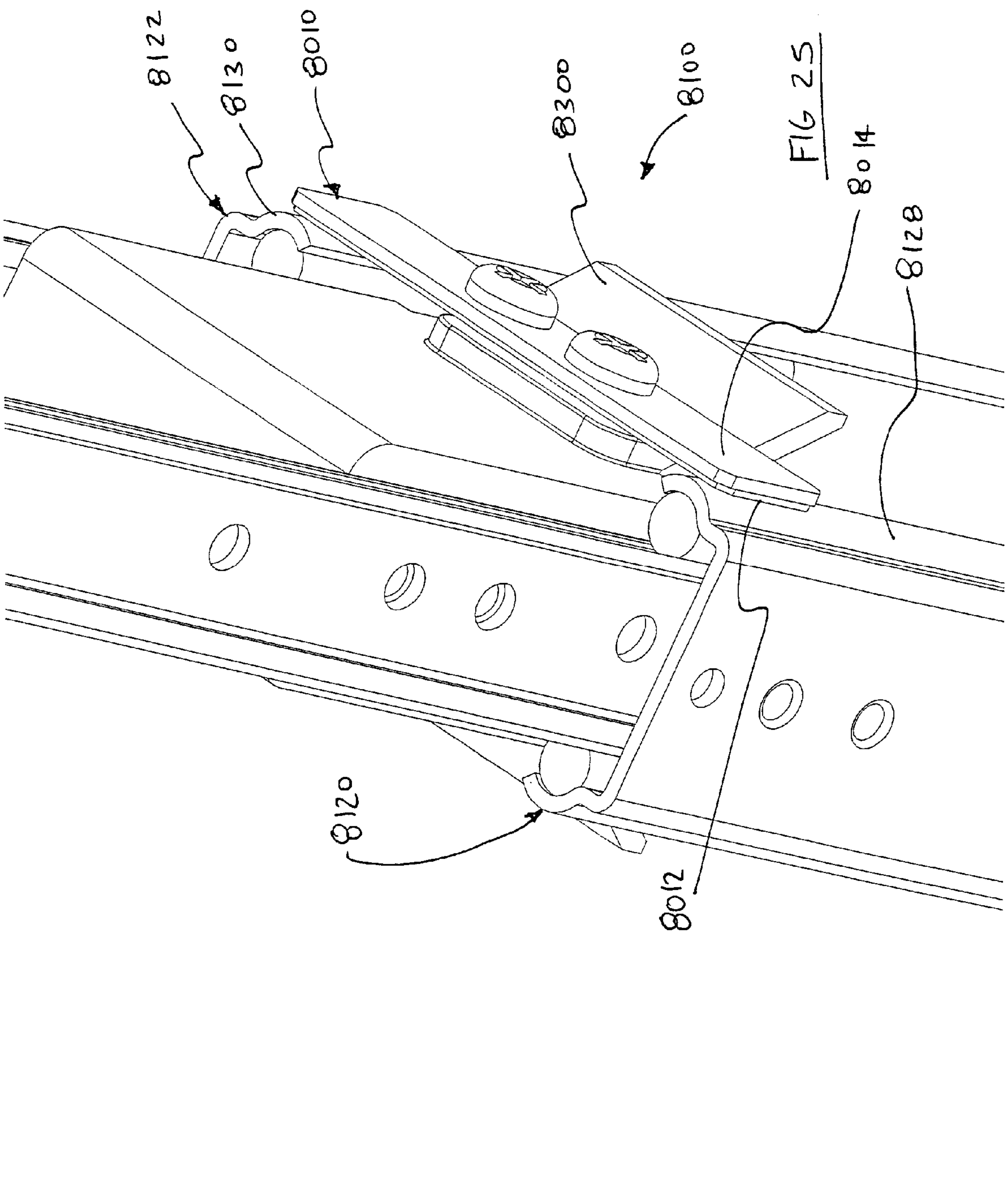
FIG. 25 is an enlarged perspective view showing a portion of the stand from the previous figure.

FIG. 25 is an enlarged perspective view showing a portion of stand 8100 from the previous figure. In the embodiment of FIG. 25, friction pad 8010 comprises a first strip 8012 and a second strip 8014. In the embodiment of FIG. 25, second strip 8014 is capable of biasing first strip 8012 against first outer rail 8128 of first slide 8120 and second outer rail 8130 of second slide 8122. In some cases for example, second strip 8014 may be urged to assume a deflected position when friction pad 8010 is fixed to shoe 8300. When this is the case, second strip 8014 may urge first strip 8012 against first outer rail 8128 of first slide 8120 and second outer rail 8130 of second slide 8122 because it is biased to return to a relaxed shape. In certain useful embodiments of the present invention, first strip 8012 comprises ultra high molecular weight polyethylene (UHMWPE) and second strip 8014 comprises spring steel.

Figure 26:
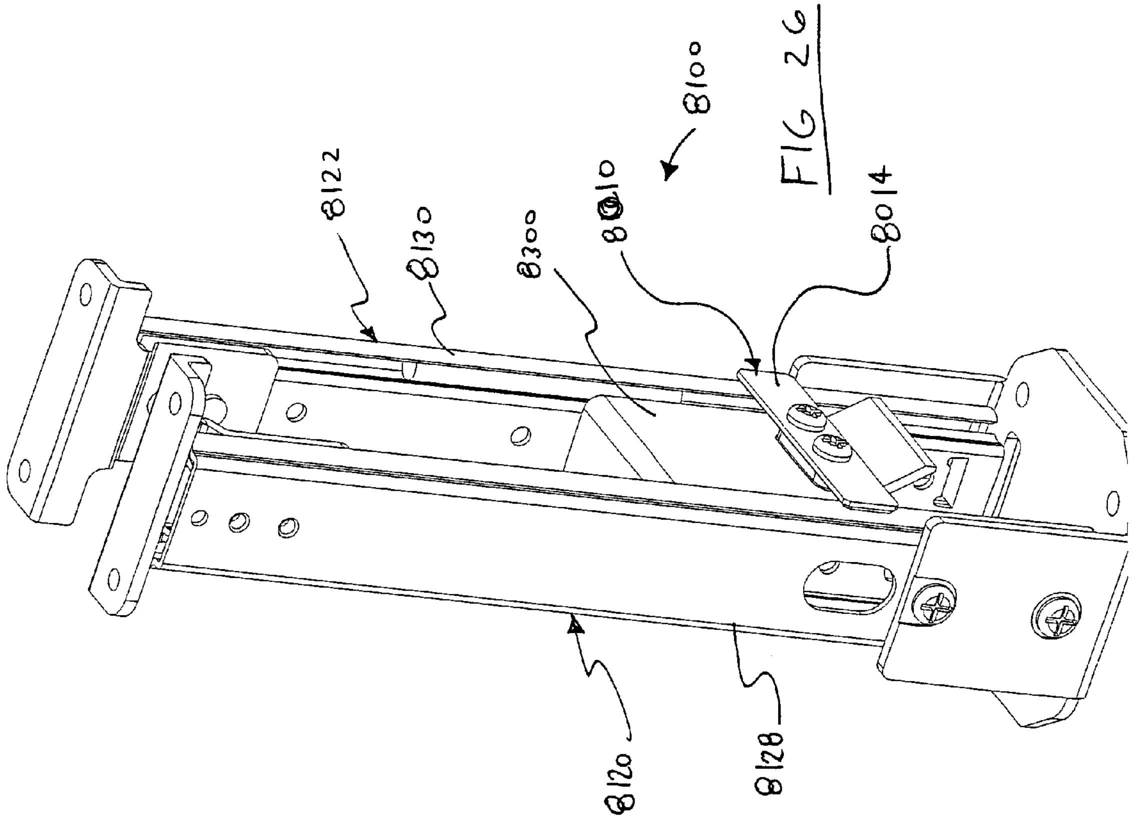
FIG. 26 is an additional perspective view of stand 8100 shown in the previous figure.

FIG. 26 is an additional perspective view of stand 8100 shown in the previous figure. In the embodiment of FIG. 26, stand 8100 has assumed a generally retracted shape. In some advantageous embodiments of the present invention, friction pad 8010 provides a friction force resisting relative movement between shoe 8300 and first outer rail 8128 of first slide 8120. Also in some advantageous embodiments of the present invention, friction pad 8010 provides a friction force resisting relative movement between shoe 8300 and second outer rail 8130 of second slide 8122.

In some particularly useful embodiments of the present invention, the spring characteristics of second strip 8014 of friction pad 8010 are selected so as to provide a desired magnitude of friction. Additionally, in some particularly useful embodiments of the present invention, a deflected shape of friction pad 8010 is selected so as to provide a desired magnitude of friction. In some embodiments of the present invention, the magnitude of the friction is selected so as to compensate for a predicted non-linearity in the behavior of one or more springs of the spring mechanism. In some embodiments of the present invention, the magnitude of the friction is selected to be sufficiently large to prevent relative movement between the first inner rail and the first outer rail when a characteristic of the constant force spring (e.g., a spring constant) varies over time.

Numerous characteristics and advantages of the invention covered by this document have been set forth in the foregoing description. It will be understood, however, that this disclosure is, in many respects, only illustrative. Changes may be made in details, particularly in matters of shape, size and ordering of steps without exceeding the scope of the invention. The invention's scope is, of course, defined in the language in which the appended claims are expressed.

What is claimed is:

1. An apparatus, comprising:

a first component and a second component disposed in sliding engagement with one another;

a means for providing a balancing force between the first component and the second component;

a magnitude of the balancing force being substantially equal to a first load;

a means for providing a friction force for resisting relative movement between the first component and the second component;

the friction force having a magnitude smaller than the magnitude of the balancing force;

wherein the means for providing the balancing force comprises a constant force spring and the means for providing the friction force comprises a shoe contacting an outer surface of a cam.

2. The apparatus of claim 1, wherein the first load comprises a weight of a first display.

3. The apparatus of claim 2, wherein a magnitude of the friction force is similar to an expected maximum variation in the weight of the first display due to manufacturing tolerances.

4. The apparatus of claim 1, further including at least one slide for guiding relative motion between the first component and the second component.

5. The apparatus of claim 4, wherein the first component and the second component are free of any mechanical interlocking preventing motion parallel to an axis of the at least one slide so that the first component and the second component may be moved relative to one another by applying a single repositioning force which overcomes the friction force.

6. The apparatus of claim 1, wherein the magnitude of the friction force is smaller than a force created by a single human hand.

7. The apparatus of claim 1, wherein the magnitude of the friction force is smaller than a force created by a single human finger.

8. The apparatus of claim 1, wherein the magnitude of the friction force is sufficiently large to prevent relative movement between the first component and the second component when a characteristic of the spring varies over time.

9. The apparatus of claim 1, the magnitude of the friction force is sufficiently large to prevent relative movement between the first component and the second component when a material of the spring creeps over time.

10. The apparatus of claim 1, wherein the magnitude of the friction force is sufficiently large to prevent relative movement between the first component and the second component due to a variation in a spring constant of the spring over the travel of the first component relative to the second component.

11. The apparatus of claim 10, wherein the pre-determined variation in the spring constant of the spring comprises a variation due to a predicted non-linearity in the spring constant.

12. An apparatus, comprising:

a first component and a second component disposed in sliding engagement with one another;

a means for providing a balancing force between the first component and the second component;

a magnitude of the balancing force being substantially equal to a first load;

a means for providing a friction force for resisting relative movement between the first component and the second component;

the friction force having a magnitude smaller than the magnitude of the balancing force;

wherein the means for providing the balancing force comprises a cam and the means for providing the friction force comprises a shoe contacting an outer surface of the cam.

13. The apparatus of claim 1, wherein the friction force comprises a static friction force.

14. The apparatus of claim 12, wherein the friction force comprises a static friction force.

15. The apparatus of claim 12, wherein the first load comprises a weight of a first display.

16. The apparatus of claim 15, wherein a magnitude of the friction force is similar to an expected maximum variation in the weight of the first display due to manufacturing tolerances.

17. The apparatus of claim 12, further including at least one slide for guiding relative motion between the first component and the second component.

18. The apparatus of claim 17, wherein the first component and the second component are free of any mechanical interlocking preventing motion parallel to an axis of the at least one slide so that the first component and the second component may be moved relative to one another by applying a single repositioning force which overcomes the friction force.

19. The apparatus of claim 12, wherein the magnitude of the friction force is smaller than a force created by a single human hand.

20. The apparatus of claim 12, wherein the magnitude of the friction force is smaller than a force created by a single human finger.

21. The apparatus of claim 12, wherein the magnitude of the friction force is sufficiently large to prevent relative movement between the first component and the second component when a characteristic of the spring varies over time.

22. The apparatus of claim 12, wherein the magnitude of the friction force is sufficiently large to prevent relative movement between the first component and the second component when a material of the spring creeps over time.

23. The apparatus of claim 12, wherein the magnitude of the friction force is sufficiently large to prevent relative movement between the first component and the second component due to a variation in a spring constant of the spring over the travel of the first component relative to the second component.

24. The apparatus of claim 23, wherein the pre-determined variation in the spring constant of the spring comprises a variation due to a predicted non-linearity in the spring constant.

25. An apparatus, comprising:

a cam having a first cam surface;

a spring assembly including a roller and a shoe;

the roller contacting the first cam surface at a rolling contact point;

the shoe contacting the first cam surface at a sliding contact point;

friction at the sliding contact point producing a friction force resisting relative movement between the cam and the shoe.

26. The apparatus of claim 25, wherein:

the roller is arranged to rotate about an axle of the spring assembly;

the shoe is pivotally coupled to the axle with a resilient member interposed between the shoe and the axle;

a portion of the shoe extending beyond the roller by a predetermined distance when the resilient member assumes a resting shape;

the resilient member being reversibly deformable so that the shoe is biased against the first cam surface at the sliding contact point while the roller is contacting the first cam surface at the rolling contact point.

27. The apparatus of claim 25, wherein a diameter of the roller and an extent of the shoe are selected to prevent deformation of the resilient member beyond a pre-determined limit.

28. The apparatus of claim 25, wherein a diameter of the roller and an extent of the shoe are selected to provide a desired deformation distance.

29. The apparatus of claim 28, wherein the deformation distance and a material characteristic of the resilient member are selected to provide a pre-determined bias force.

30. The apparatus of claim 29, wherein the predetermined bias force is selected to provide a desired friction force.

31. The apparatus of claim 25, wherein the roller and the cam act upon one another at the rolling contact point to produce a balancing force between a head of the apparatus and a base of the apparatus.

32. The apparatus of claim 31, wherein a magnitude of the balancing force is substantially equal to a first load.

33. The apparatus of claim 32, wherein a combination of the balancing force and the friction force is capable of supporting a second load that is larger than the first load.

34. The apparatus of claim 32, wherein the friction force is sufficiently large to prevent relative movement between the head and the base when the apparatus is supporting a third load which is smaller than the first load.

35. The apparatus of claim 25, wherein:

the roller is arranged to rotate about an axle of the spring assembly;

the shoe is pivotally coupled to the axle with a resilient member interposed between the shoe and the axle;

a distal portion of the shoe extending beyond an outer periphery of the roller while the resilient member is in a relaxed state;

the resilient member being sufficiently deformable to allow the shoe to assume a retracted position in which a distal surface of the distal portion of the shoe is aligned with the outer periphery of the roller.

36. A method of supporting a load comprising the steps of:

providing an apparatus comprising a cam, a roller arranged to rotate about an axle, and a shoe pivotally coupled to the axle with a resilient member interposed between the shoe and the axle, wherein a portion of the shoe extending beyond the roller by a predetermined distance when the resilient member assumes a resting shape; and urging the shoe against a first cam surface of the cam and deforming the resilient member so that the shoe is biased against the first cam surface at a sliding contact point while the roller is contacting the first cam surface at a rolling contact point.

37. The apparatus of claim 36, wherein a diameter of the roller and an extent of the shoe are selected to prevent deformation of the sleeve beyond a pre-determined limit.

38. The apparatus of claim 36, wherein a diameter of the roller and an extent of the shoe are selected to provide a desired deformation distance.

39. The apparatus of claim 36, wherein the roller and the shoe are both urged against the cam surface of the cam by a spring.

40. The apparatus of claim 39, wherein the deformation distance and a material characteristic of the resilient member are selected to provide a pre-determined bias force.

41. The apparatus of claim 40, wherein the predetermined bias force is selected to provide a desired friction force.

* * * * *